(12) United States Patent
Flood

(10) Patent No.: US 11,907,318 B2
(45) Date of Patent: *Feb. 20, 2024

(54) WASTE CONTAINER MONITORING SYSTEM

(71) Applicant: Advanced Custom Engineered Systems & Equipment Co., St. Charles, IL (US)

(72) Inventor: Christopher M. Flood, St. Charles, IL (US)

(73) Assignee: ADVANCED CUSTOM ENGINEERED SYSTEMS & EQUIPMENT CO., St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,005

(22) Filed: Aug. 10, 2022

(65) Prior Publication Data

US 2022/0382822 A1 Dec. 1, 2022

Related U.S. Application Data

(63) Continuation of application No. 17/244,029, filed on Apr. 29, 2021, now Pat. No. 11,461,424, which is a
(Continued)

(51) Int. Cl.
*G06K 7/10* (2006.01)
*G06V 10/10* (2022.01)
(Continued)

(52) U.S. Cl.
CPC ........ *G06F 16/9554* (2019.01); *B30B 9/3007* (2013.01); *B30B 9/3042* (2013.01);
(Continued)

(58) Field of Classification Search
CPC ......... G06K 19/07758; G06K 7/10297; G06K 19/145; G06K 7/0004; G06K 7/10316; G06K 7/10415
See application file for complete search history.

(56) References Cited

U.S. PATENT DOCUMENTS 3,636,863 A 1/1972 Woyden
3,765,147 A 10/1973 Ippolito et al.
(Continued)

FOREIGN PATENT DOCUMENTS

AU 2005-211634 A1 4/2007
AU 2006-225303 A1 4/2008
(Continued)

OTHER PUBLICATIONS

Dec. 11, 2018—(U.S.) Non-Final Office Action—U.S. Appl. No. 15/406,970.
(Continued)

*Primary Examiner* — Jessica M Prince
(74) *Attorney, Agent, or Firm* — McDonnell Boehnen Hulbert & Berghoff LLP

(57) ABSTRACT

A container having a compactor and bin for waste is disclosed permitting on-premises and remote monitoring of the system and collection is disclosed. The system can also detect non-complaint materials placed therein and act thereon. Methods are further disclosed for inventorying identification tags for tracking packages, merchandise and tags disposed of.

20 Claims, 8 Drawing Sheets

Related U.S. Application Data continuation of application No. 14/593,764, filed on Jan. 9, 2015, now Pat. No. 11,017,049, which is a continuation of application No. 12/035,288, filed on Feb. 21, 2008, now abandoned.

(60) Provisional application No. 60/902,462, filed on Feb. 21, 2007.

(51) Int. Cl.
  *G06F 16/955* (2019.01)
  *B30B 9/30* (2006.01)
  *G06Q 10/087* (2023.01)

(52) U.S. Cl.
  CPC ..... *G06K 7/10297* (2013.01); *G06K 7/10316* (2013.01); *G06K 7/10415* (2013.01); *G06Q 10/087* (2013.01); *Y02P 90/84* (2015.11)

(56) References Cited

U.S. PATENT DOCUMENTS

| | | |
|---|---|---|
| 4,854,406 A | 8/1989 | Appleton et al. |
| 4,953,109 A | 8/1990 | Burgis |
| 4,955,495 A | 9/1990 | Ruebesam |
| 5,004,392 A | 4/1991 | Naab |
| 5,014,206 A | 5/1991 | Scribner et al. |
| 5,119,894 A | 6/1992 | Crawford et al. |
| 5,209,312 A | 5/1993 | Jensen |
| 5,222,853 A | 6/1993 | Carson |
| 5,230,393 A | 7/1993 | Mezey |
| 5,303,642 A | 4/1994 | Durbin et al. |
| 5,304,744 A | 4/1994 | Jensen |
| 5,326,939 A | 7/1994 | Schafer |
| 5,389,346 A | 2/1995 | Copeland, Jr. |
| 5,401,915 A | 3/1995 | Schafer |
| 5,416,706 A | 5/1995 | Hagenbuch |
| 5,464,489 A | 11/1995 | De Graaf |
| 5,565,846 A | 10/1996 | Geiszler et al. |
| 5,631,835 A | 5/1997 | Hagenbuch |
| 5,644,489 A | 7/1997 | Hagenbuch |
| 5,726,884 A | 3/1998 | Sturgeon et al. |
| 5,740,050 A | 4/1998 | Ward, II |
| 5,837,945 A | 11/1998 | Cornwell et al. |
| 5,861,805 A | 1/1999 | Reeves |
| 5,909,480 A | 6/1999 | Reynaud et al. |
| 5,947,256 A | 9/1999 | Patterson |
| 5,967,028 A | 10/1999 | Schomisch et al. |
| 6,021,712 A | 2/2000 | Harrop |
| 6,055,902 A * | 5/2000 | Harrop ................. B30B 9/3007 100/229 A |
| 6,170,318 B1 | 1/2001 | Lewis |
| 6,191,691 B1 | 2/2001 | Serrault |
| 6,206,282 B1 | 3/2001 | Hayes, Sr. et al. |
| 6,302,461 B1 | 10/2001 | Debras et al. |
| 6,318,636 B1 | 11/2001 | Reynolds et al. |
| 6,412,406 B1 | 7/2002 | Flood et al. |
| 6,421,080 B1 | 7/2002 | Lambert |
| 6,429,776 B1 | 8/2002 | Alicot et al. |
| 6,448,898 B1 | 9/2002 | Kasik |
| 6,510,376 B2 | 1/2003 | Burnstein et al. |
| 6,600,418 B2 | 7/2003 | Francis et al. |
| 6,601,015 B1 | 7/2003 | Milvert et al. |
| 6,647,200 B1 | 11/2003 | Tanaka |
| 6,759,959 B2 | 7/2004 | Wildman |
| 7,225,980 B2 | 6/2007 | Ku et al. |
| 7,256,682 B2 | 8/2007 | Sweeney, II |
| 7,275,645 B2 | 10/2007 | Mallett et al. |
| 7,318,529 B2 | 1/2008 | Mallett et al. |
| 7,328,842 B2 | 2/2008 | Wagner et al. |
| 7,385,510 B2 | 6/2008 | Childress et al. |
| 7,436,303 B2 | 10/2008 | Tourrilhes et al. |
| 7,454,358 B2 | 11/2008 | Mallett et al. |
| 7,456,418 B1 | 11/2008 | Stevens et al. |
| 7,487,100 B2 | 2/2009 | Mallett et al. |
| 7,501,951 B2 | 3/2009 | Maruca et al. |
| 7,511,611 B2 | 3/2009 | Sabino et al. |
| 7,518,506 B2 | 4/2009 | Lee et al. |
| 7,525,443 B2 | 4/2009 | Littrell |
| 7,591,421 B2 | 9/2009 | Linton et al. |
| 7,609,406 B2 | 10/2009 | Roth et al. |
| 7,639,136 B1 | 12/2009 | Wass et al. |
| 7,660,724 B2 | 2/2010 | Mallett et al. |
| 7,728,730 B2 | 6/2010 | Langlois et al. |
| 7,870,042 B2 | 1/2011 | Maruca et al. |
| 8,014,863 B2 | 9/2011 | Zhang et al. |
| 8,015,029 B2 | 9/2011 | Flood |
| 8,020,767 B2 | 9/2011 | Reeves et al. |
| 8,056,817 B2 | 11/2011 | Flood |
| 8,109,759 B2 | 2/2012 | Robertson et al. |
| 8,146,798 B2 | 4/2012 | Flood et al. |
| 8,165,277 B2 | 4/2012 | Chen et al. |
| 8,185,277 B2 | 5/2012 | Flood et al. |
| 8,210,428 B2 | 7/2012 | Flood |
| 8,714,440 B2 | 5/2014 | Flood et al. |
| 9,251,388 B2 | 2/2016 | Flood |
| 9,396,453 B2 | 7/2016 | Hynes et al. |
| 2001/0028032 A1 | 10/2001 | Church et al. |
| 2002/0077875 A1 | 6/2002 | Nadir |
| 2002/0105424 A1 | 8/2002 | Alicot et al. |
| 2002/0163577 A1 | 11/2002 | Myers |
| 2002/0180588 A1 | 12/2002 | Erickson et al. |
| 2002/0196150 A1 | 12/2002 | Wildman |
| 2003/0025599 A1 | 2/2003 | Monroe |
| 2003/0031543 A1 | 2/2003 | Elbrink |
| 2003/0069716 A1 | 4/2003 | Martinez |
| 2003/0071736 A1 | 4/2003 | Brazier et al. |
| 2004/0123812 A1 | 7/2004 | Condon |
| 2004/0133484 A1 | 7/2004 | Kreiner et al. |
| 2004/0145472 A1 | 7/2004 | Schmidtberg et al. |
| 2004/0178264 A1 | 9/2004 | Linton et al. |
| 2004/0199401 A1 | 10/2004 | Wagner et al. |
| 2004/0215351 A1 | 10/2004 | Kiire et al. |
| 2004/0233284 A1 | 11/2004 | Lesesky et al. |
| 2004/0257203 A1 | 12/2004 | Maltsev et al. |
| 2005/0018049 A1 | 1/2005 | Falk |
| 2005/0080520 A1 * | 4/2005 | Kline .................... B65F 1/0006 701/1 |
| 2005/0088299 A1 | 4/2005 | Bandy et al. |
| 2005/0126405 A1 | 6/2005 | Imperato |
| 2006/0012481 A1 | 1/2006 | Rajapakse et al. |
| 2006/0032917 A1 | 2/2006 | Ritter |
| 2006/0080819 A1 | 4/2006 | McAllister |
| 2006/0157206 A1 | 7/2006 | Weik et al. |
| 2006/0177119 A1 | 8/2006 | McPheely et al. |
| 2006/0208072 A1 | 9/2006 | Ku et al. |
| 2006/0208859 A1 | 9/2006 | Hougen et al. |
| 2006/0212306 A1 * | 9/2006 | Mallett .................. A61B 50/10 705/308 |
| 2006/0220922 A1 | 10/2006 | Brinton et al. |
| 2006/0221363 A1 | 10/2006 | Roth et al. |
| 2006/0253297 A1 | 11/2006 | Mallett et al. |
| 2006/0273180 A1 | 12/2006 | Ammond et al. |
| 2007/0014693 A1 | 1/2007 | Kantrowitz et al. |
| 2007/0025600 A1 | 2/2007 | Ghebreyesus |
| 2007/0033108 A1 | 2/2007 | Luhr |
| 2007/0085676 A1 | 4/2007 | Lee et al. |
| 2007/0109103 A1 | 5/2007 | Jedrey et al. |
| 2007/0112620 A1 | 5/2007 | Johnson et al. |
| 2007/0126592 A1 | 6/2007 | Littrell |
| 2007/0143079 A1 | 6/2007 | Duxbury et al. |
| 2007/0217761 A1 | 9/2007 | Chen et al. |
| 2007/0227125 A1 | 10/2007 | Robertson et al. |
| 2007/0236352 A1 | 10/2007 | Allen et al. |
| 2007/0250339 A1 | 10/2007 | Mallett et al. |
| 2007/0257857 A1 | 11/2007 | Marino et al. |
| 2007/0260466 A1 | 11/2007 | Casella et al. |
| 2007/0262878 A1 | 11/2007 | Maruca et al. |
| 2007/0268759 A1 | 11/2007 | Sabino et al. |
| 2008/0001746 A1 | 1/2008 | Childress et al. |
| 2008/0010197 A1 | 1/2008 | Scherer |
| 2008/0061125 A1 | 3/2008 | Langlois et al. |
| 2008/0061977 A1 * | 3/2008 | Maruca ............. G06Q 10/0637 340/572.1 |

(56) References Cited

U.S. PATENT DOCUMENTS

| | | |
|---|---|---|
| 2008/0077541 A1 | 3/2008 | Scherer et al. |
| 2008/0162372 A1 | 7/2008 | Margolis et al. |
| 2008/0169342 A1 | 7/2008 | Gonen |
| 2008/0185540 A1 | 8/2008 | Turner et al. |
| 2008/0197059 A1 | 8/2008 | Mallett et al. |
| 2008/0197194 A1 | 8/2008 | Flood |
| 2008/0198021 A1 | 8/2008 | Flood |
| 2008/0202357 A1 | 8/2008 | Flood |
| 2008/0211637 A1 | 9/2008 | Smith |
| 2008/0237251 A1 | 10/2008 | Barber |
| 2008/0275287 A1 | 11/2008 | Stevens et al. |
| 2008/0297314 A1 | 12/2008 | Kuwako et al. |
| 2008/0308631 A1 | 12/2008 | Mitschele et al. |
| 2009/0276299 A1 | 11/2009 | Gonen et al. |
| 2010/0088203 A1 | 4/2010 | Hynes et al. |
| 2010/0116881 A1 | 5/2010 | Flood et al. |
| 2010/0119340 A1 | 5/2010 | Flood et al. |
| 2010/0119341 A1 | 5/2010 | Flood et al. |
| 2010/0167704 A1 | 7/2010 | Villemaire |
| 2011/0279245 A1 | 11/2011 | Hynes et al. |
| 2012/0120449 A1 | 5/2012 | Flood et al. |
| 2014/0182951 A1 | 7/2014 | Curotto |
| 2014/0239059 A1 | 8/2014 | Flood et al. |

FOREIGN PATENT DOCUMENTS

| | | |
|---|---|---|
| CA | 2678933 C | 10/2016 |
| DE | 3933795 A1 | 4/1991 |
| DE | 19708204 C2 | 12/1999 |
| EP | 0500213 A1 | 8/1992 |
| EP | 0557238 B1 | 5/1997 |
| EP | 0899215 A1 | 3/1999 |
| GB | 2464272 A | 4/2010 |
| GB | 2464272 B | 2/2011 |
| JP | H06-044483 A | 2/1994 |
| JP | 7-033455 | 3/1995 |
| JP | 09245168 | 9/1997 |
| JP | 3-241180 B2 | 12/2001 |
| JP | 2003-246409 A | 9/2003 |
| JP | 2004-137042 A | 5/2004 |
| JP | 2005-008339 A | 1/2005 |
| JP | 2005-063217 A | 3/2005 |
| JP | 2005-067850 A | 3/2005 |
| JP | 2006-44483 A | 2/2006 |
| JP | 2006-163324 A | 6/2006 |
| JP | 2006-215857 A | 8/2006 |
| JP | 2007-33455 A | 2/2007 |
| JP | 2007-063014 A | 3/2007 |
| JP | 6-044483 B2 | 12/2016 |
| KR | 10-2006-0005812 A | 1/2006 |
| KR | 10-2006-0026226 A | 3/2006 |
| KR | 2006-0109306 A | 10/2006 |
| KR | 10-2007-0032381 A | 3/2007 |
| KR | 10-0732381 | 6/2007 |
| RU | 2230015 C1 | 6/2004 |
| RU | 113395 U1 | 2/2012 |
| WO | 97/003768 A1 | 2/1997 |
| WO | 98/038593 A1 | 9/1998 |
| WO | 99/039899 A1 | 8/1999 |
| WO | 08/103820 A9 | 10/2008 |
| WO | 10/054232 A1 | 5/2010 |

OTHER PUBLICATIONS

International Search Report for PCT/US2008/054571 dated Aug. 14, 2008.
International Preliminary Report on Patentability for PCT/US2008/054571 dated Aug. 26, 2009.
Written Opinion of ISA for PCT/US2008/054571 dated Aug. 14, 2008.
International Search Report for PCT/US2009/063601 dated Mar. 12, 2010.
International Preliminary Report on Patentability for PCT/US2009/063601 dated May 10, 2011.
Written Opinion of ISA for PCT/us2009/063601 dated Mar. 12, 2010.
Supplementary European Search Report for EP 08730384 dated Oct. 17, 2011.
First Examination Report for EP 08730384.8 dated Nov. 22, 2012.
Aug. 14, 2017—(WO) International Search Report and Written Opinion—App PCT/US2017/025569.
May 17, 2019—(U.S.) Non-Final Office Action—U.S. Appl. No. 15/011,940.
Petition for Inter Partes Review of U.S. Pat. No. 8,146,798 Pursuant to 35 U.S.C. Secs. 311-319, 37 C.F.R. Section 42 (80 pages).
Petitioner's Reply to Patent Owner's Response to Petition, Case No. IPR2018-00139 dated Jan. 25, 2019 (30 bages).
Petitioner's Demonstrative Exhibits, Case No. IPR2018-00139, U.S. Patent No. 8,146,798 (50 pages).
Exhibit 1032 of Petitioner's Reply to Patent Owner's Response to Petition served Jan. 25, 2019 entitled Morgan D. Rosenberg—Essentials of Patent Claim Drafting (2019 Edition) Section 3.02 (12 pages).
Final Written Decision, Case IPR2018-00139, U.S. Pat. No. 8,146,798, Paper No. 35 dated May 20, 2019 (36 pages).
Exhibits to Petition For Inter Parties Review of U.S. Pat. No. 8,146,798 Pursuant to 35 U.S.C. Secs. 311-319, 37 C.F.R. Section 42.
Local Patent Rule 2.3 Disclosures from *Sonrai Systems, LLC, et al. v. AMCS Group, Inc.*, No. 1:16-cv-9404.
PCT International Search Report and Written Opinion of the International Searching Authority dated Aug. 14, 2017.
First Examination Report for EP 08730384.8 dated Nov. 22, 2012 (7 pages).
International Preliminary Report on Patentability for PCT/US2008/054571 dated Aug. 26, 2009 (1 page).
International Preliminary Report on Patentability for PCT/US2009/063601 dated May 10, 2011 (1 page).
International Search Report for PCT/US2008/054571 dated Aug. 14, 2008 (4 pages).
International Search Report for PCT/US2009/063601 dated Mar. 12, 2010 (3 pages).
Supplementary European Search Report for EP 08730384 dated Oct. 17, 2011 (9 pages).
Written Opinion of International Searching Authority for PCT/US2008/054571 dated Aug. 14, 2008 (7 pages).
Written Opinion of International Searching Authority for PCT/US2009/063601 dated Mar. 12, 2010 (7 pages).
Nov. 8, 2018—(U.S.) Non-Final Office Action—U.S. Appl. No. 14/593,764.

* cited by examiner

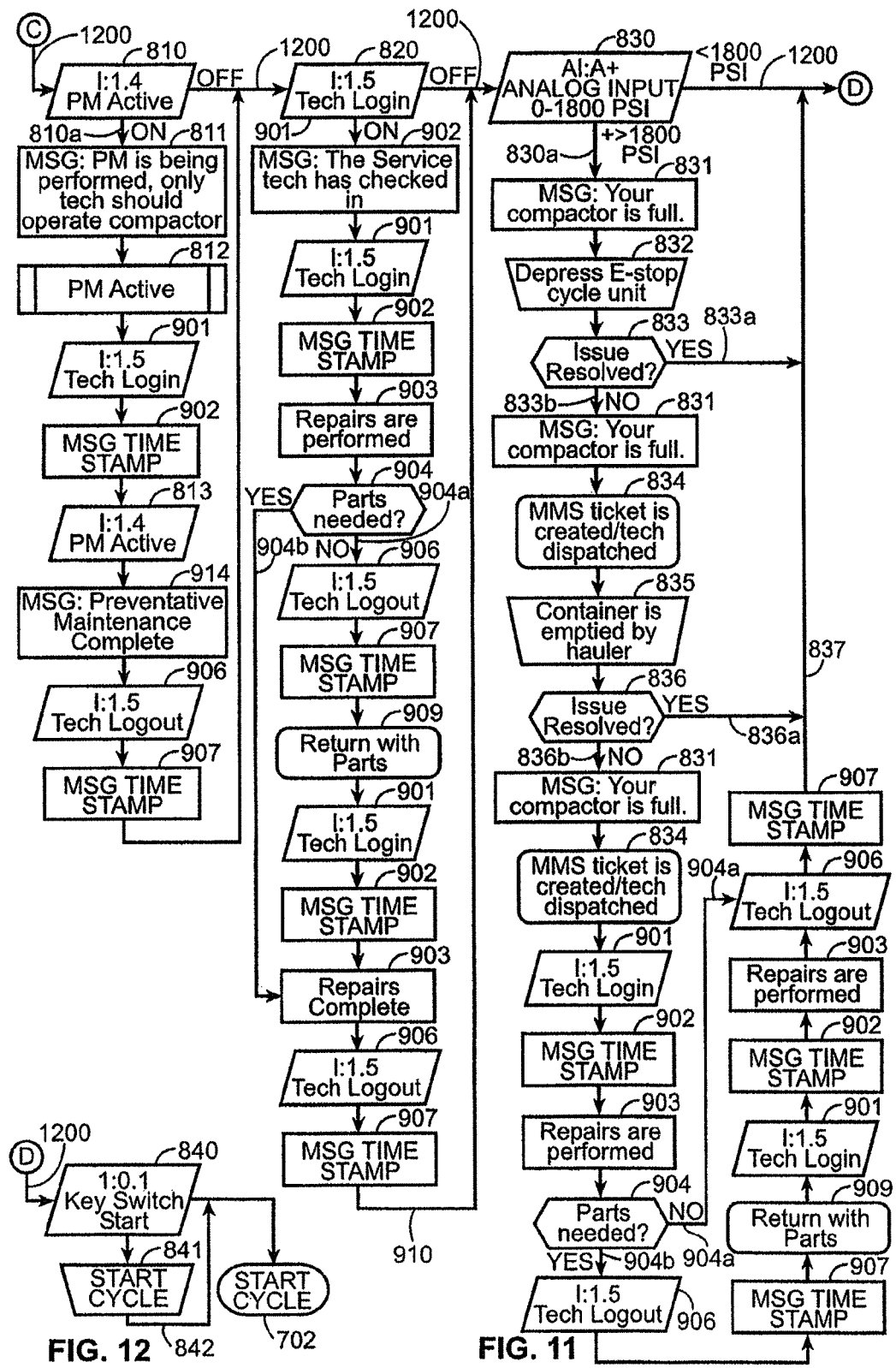

WASTE CONTAINER MONITORING SYSTEM

CROSS-REFERENCE TO RELATED APPLICATIONS

This application is a continuation application of U.S. application Ser. No. 17/244,029, filed on Apr. 29, 2021, which claims priority to U.S. application Ser. No. 14/593,764, filed on Jan. 9, 2015, which claims priority to U.S. application Ser. No. 12/035,288, filed on Feb. 21, 2008, now abandoned, which claims priority to U.S. Provisional Patent Application No. 60/902,462, filed Feb. 21, 2007, each of which is hereby incorporated by reference in its entirety. Also incorporated by reference in its entirety is U.S. application Ser. No. 15/883,980, filed on Jan. 30, 2018, which issued as U.S. Pat. No. 10,585,964 on Mar. 10, 2020, which claims priority to U.S. application Ser. No. 12/035,288 and U.S. Provisional Patent Application No. 60/902,462.

TECHNICAL FIELD

The present invention relates to the management of trash and recyclables and the equipment associated with it, and in particular, the remote monitoring and controlling of waste equipment (e.g., containers, bins, balers and compactors) and the trash and recyclables therein and recycling thereof. The equipment can be located at several locations and monitored from several locations, such as a central station, by several different techniques, such as over the internet, over an ethernet, by cell phone lines/towers and via regular phone lines. The invention also includes a system incorporating methods and apparatuses relating to product information, such as RFID tags or others, passing though the equipment. The product information can be used to detect non-compliant materials, such as hazardous material, inventories and the assignment of new product information.

BACKGROUND

The collection and transportation of trash and recyclables from commercial, industrial and large residential facilities is a major industry in the United States and throughout the world. Typically, trash and recyclables are accumulated and temporarily stored in waste material containers, such as dumpsters and balers. When filled, or at regularly scheduled intervals, trash and recyclables from the containers are transported for the eventual recycling, incineration and/or disposal into landfills.

Customers typically pay for trash and recyclables removal services based on the amount of trash and recyclables removed and the number of trash and recyclables pickups over a period of time. The compacting of trash and recyclables at a customer's location typically reduces the number of pickups. A successful trash and recyclables compactor is disclosed in U.S. Pat. No. 6,412,406, titled Trash Compactor and owned by Advanced Custom Engineered Systems & Equipment, Inc., Carol Stream, Ill., assignee of the present invention.

These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

For large organizations this can be a very complicated task as there are many haulers and many customers needing their trash and recyclables collected, picked-up and hauled away. In addition, commercial, industrial and large residential (e.g., condos and apartment buildings) trash and recyclables compactors and balers must be monitored for maintenance and repair. This, too, requires time and energy for the haulers and/or representatives (of the service provider) to monitor and inspect.

For large organizations this can be a very complicated to coordinate. It can also be complicated to verify the charges for these services are fair and accurate, as there are many service providers and many customers needing their compactors, bins and balers repaired.

In addition, it must be recognized that trash and recyclables compactors, balers and bins must further be monitored for maintenance and repair.

Further, RFID tags, and other similar tags, are used to identify products, packaging and pallets. They can be used for monitoring the flow of inventory into and through a facility. However, it is believed no one successfully monitors such tags as they leave a facility. Important information can be gained by doing this.

Accordingly, there is a need for better data collection and scheduling and monitoring capabilities associated with trash and recyclables.

SUMMARY

The present development is an advancement over existing systems. It employs RFID or similar technologies to track the progress of the trash and recyclables through the disposal system (e.g., pick-up and delivery to destination) and to monitor the equipment (e.g., bins, balers and compactors).

According to a first aspect of the present invention, a system is disclosed for monitoring the collection of waste. The system includes a compactor and a bin wherein the compactor includes a ram movable between a retracted position outside the bin and an extended position inside the bin. The system also includes a chute door for passing waste into the bin. The system has a central controller for receiving inputs from one or more sources and for storing the input received into a memory and/or transmitting them to a remote location, such as a central station. In the alternative, the received inputs can be held in memory (at the container's location or a remote location) and polled later from a remote location, such as a central location. The inputs include an emergency stop switch for stopping the ram from moving, a chute door sensor for detecting when the chute door is open, a compactor oil level sensor for determining the pressure of oil in the compactor, a sensor between a compactor opening and a bin opening to ensure the ram can move between the retracted and the extended positions, an overload sensor to determine if the power is not overloaded, and a pressure sensor to determine if the level of waste in the bin is above a threshold.

In addition, the input to the controller is transmittable to a separate location via ethernet, internet, telephone communications lines, cell phone communication signals or dedicated communication lines. Each input has a threshold alarm condition and if that threshold alarm condition is reached, the central controller generates an alarm. The alarm is preferably an audio alarm. The alarm can also be in the form of a transmission to a separate location via ethernet, internet, telephone communications lines, cell phone communication signals or dedicated communication lines. One such alarm or condition is a call for a technician. Further, the input received by the controller can be stored in a memory associated with the controller or in a memory at a remote location.

The input stored in the local controller's memory or remote memory can be used to generate reports of events (history) or as status checks. Further, the controller can be controlled remotely so as to operate the compactor during an alarm condition.

According to a second aspect of the present invention, a system for monitoring the container for waste is disclosed having a camera positioned so as to record images at or around the container. The camera has a memory associated therewith, means for selecting a recording interval, sensor means for detecting an event associated with the container, and means for separating and storing in memory a recorded interval once the sensor has detected an event. The preferable camera is a digital camera. The interval comprises a first preselected time before an event and a second preselected time after an event. The digital camera continues to record images simultaneously while the system is separating and storing. Further, the camera includes a system for notifying remote locations an event has been detected, such as an alarm. Additionally, the notification can be an audio message, email message, picture segment, MMS message and SMS message.

An associated method is also disclosed wherein a camera is positioned in a location so as to record images at or around the container, a memory is provided associated with the camera, a recording interval is selected, an event associated with the container is detected by a sensor, and the camera or system separates and stores in memory a recorded interval once an event has been detected. The selecting step comprises selecting a first preselected time before an event and selecting a second preselected time after an event. And, the camera continues to record images simultaneously while the system is separating and storing. The camera further includes a system for notifying remote locations an event has been detected, such as an audio alarm, audio message, email message, picture segment, MMS message and SMS message.

According to a third aspect of the present invention, a container is disclosed wherein one or more items of waste include a tag having identification information thereon. The container has a plurality of walls to contain the items and an antenna positioned relative to the container for obtaining and transmitting (wirelessly or via cable(s)) the identification information on the tags within the container to a reader. The reader reads the information and either records the identification information in a memory or communicates the identification information associated with the tags to a remote location. The tags are preferably passive RFID tags and the antenna further activates the tags. The tags can also be EAS tags or other tags.

The antenna is mounted on a wall and an opening is provided in the wall between the antenna and the items in the container to enhance signal communications between the antenna and items in the container. The antenna is further shielded from external noise (e.g., other identification tags located outside the container) by encasing it in a metal, except for the opening. A data line may be disposed between the antenna and a reader. In the alternative, the antenna and reader can be wirelessly connected. The reader is in turn connected to means for recording the identification information and/or means for communicating the identification information associated with the tags. The reader is connected to the PLC and/or to a remote location such as a central station. The antenna is thusly connected to a control panel via the reader; the read information is stored and/or transmitting to another system such as a central station.

The reader further has associated software and hardware for detecting non-compliant items and a system for alerting a worker an item in the container is non-compliant. Such non-compliant items include hazardous material.

Additionally, the container can have a door. The antenna can be mounted thereon with an opening in the door being provided between the antenna and the items in the container to enhance signal communications between the antenna and items in the container. The door, movable between an open position and a closed position, also has a sensor in communications with a switch to detect the door in either the open position or the closed position and to turn the antenna on only when the door is in the closed position and turn the antenna off when the door is in the open position.

A method incorporating the above system is also disclosed. The method of reading identification information on tags with each tag being attached to an item in a waste container, comprises the steps of securing an antenna to a wall of the container for reading the identification information on the tags within the container, transmitting the information to a reader, and recording the identification information and/or communicating the identification information associated with the tags to a separate location. The step of securing the antenna further includes providing an opening in the wall between the antenna and the items in the container to enhance signal communications between the antenna and items in the container. The method further includes the step of shielding the antenna from external noise by encasing it in a metal, except for the opening. The wall may also include a door with the antenna being secured to the door.

A fourth aspect of the present invention includes a method for recycling identifying information stored on tags of items with each tag corresponding to an item. The method includes the step of providing a waste container with an antenna associated therewith for obtaining the identification information on the tags within the container, reading the identifying information, collecting the identifying information associated with the items in the container, disposing of the items in the container, reassigning the collected identifying information to new tags associated with new items. A further step includes communicating the collected identifying information to a system capable of inventorying the collected identifying information and reassigning the collected identifying information. If the tags are passive RFID tags, the antenna further activates the tags. Of course, the tags can be different types of tags, such as RFID tags and EAS tags.

A fifth aspect of the present invention includes a method of monitoring or inventorying shelved items at a location comprising the steps of placing at least one tag on each package storing one or more items therein with each tag having identifying information thereon relating to the items in the package, providing a waste container for disposing of the packages after the items have been removed therefrom, providing an antenna for the waste container for obtaining the identification information on the tags placed in the waste container, reading the obtained identifying information, and collecting the identifying information associated with items in the container. Again, the step of communicating the collected identifying information to a system capable of inventorying the collected identifying information and monitoring the items removed from the packages at a location associated with the container can be performed.

According to a sixth aspect of the present invention, a method for determining the weight of the product in a container is disclosed comprising the steps above except each tag having identifying information thereon relates to the weight of the empty package. The waste container holds the packages after the items have been removed therefrom. An antenna and reader are provided for the waste container for reading the weight information on the tags placed in the waste container. The weight information associated with the tags in the container is communicated to a system capable of inventorying the collected weight information and calculating the total weight of packages in the container.

The information obtained can be used after the waste has been recycled for obtaining carbon credits. It can also be used to schedule removal of the container by a hauler.

It is believed this system can nearly eliminate instances of costly misdirected or unnecessary service dispatch and call center activity, as well as MMS (Maintenance Management System) frustration. The present system is capable of managing assets (e.g., equipment) to their peak performance, optimizing the return on investment. This objective is achieved combining asset and service management with clear definitions. As a result, service level agreements can be had at lower long-term costs, with automated response plans for proactive equipment and supply chain management.

In summary, this single on-line platform enables successful equipment service and management of hauling services with the added value of collecting accurate inventory and product specific data to provide complete user ready RFID systems benefiting inventory management and loss prevention.

Other advantages and aspects of the present invention will become apparent upon reading the following description of the drawings and the detailed description of the invention.

BRIEF DESCRIPTION OF THE FIGURES

FIGS. 8-12 are portions of a single flow chart of the system's tests between the compactor's start and the beginning of a cycle.

DETAILED DESCRIPTION

Figure 1:
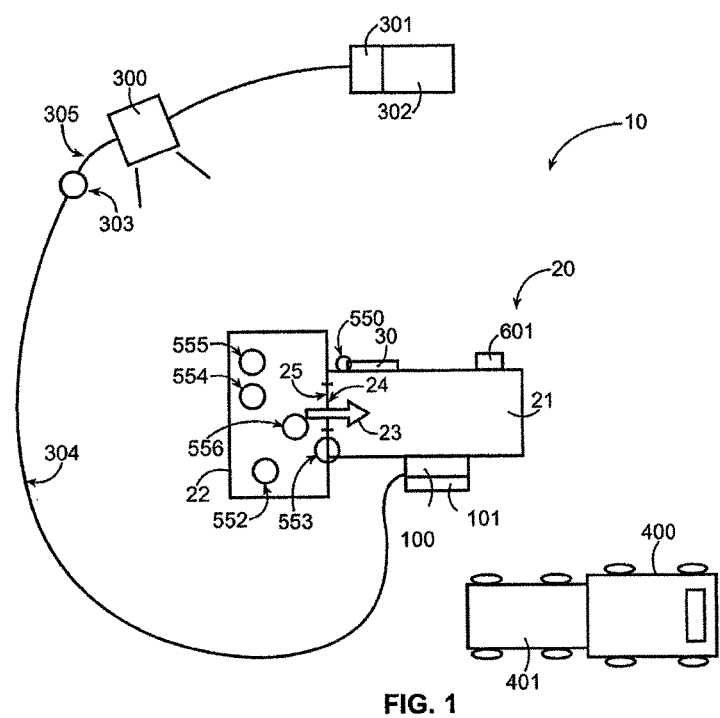
FIG. 1 is a schematic drawing, top view, of the system of the present invention.

While this invention is susceptible of embodiments in many different forms, there is shown in the drawings and will herein be described in detail, preferred embodiments of the invention with the understanding the present disclosure is to be considered as an exemplification of the principles of the invention and is not intended to limit the broad aspect of the invention to the embodiments illustrated. The present invention will have the following main components and techniques for operation of the device.

For the purposes of the present disclosure, the term "waste" is used in its broadest sense and includes trash and recyclables. It not only includes items being destroyed or put in a landfill, such as trash, but also recyclables, such as paper, corrugation board, cardboard, etc.

The term "container" is also used in its broadest sense and can include bins, balers, compactors, etc. for holding waste and/or recyclables.

I. General Configuration of the System 10

The term "container" is also used in its broadest sense and can include bins, balers, compactors, etc. for holding waste and/or recyclables.

FIG. 1 shows a general arrangement of the system 10 of the present invention. A container 20 is shown having two general components, that being a bin 21 for storing waste and a compactor 22 adjacent to the bin for driving a ram 23 to compress or compact waste in the container 20. An opening 24 in the compactor 22 is aligned with an opening 25 in the bin 21 to permit the ram 23 to move and extend from the compactor into the bin 21 (extended position) and then move back or retract into the compactor (retracted position).

The bin further has at least one opening, schematically shown at reference number 30 for placing waste. This door 30 is commonly called the "chute door." It is recognized containers and balers generally can take many forms, depending on purpose, position, space, size and manufacturer. Accordingly, their sizes, shapes and orientation of components can vary greatly.

The ram control 557,700 is on the cover 101 of the main or master control panel 100. It may also be in the panel 100. However, it can be separated and located adjacent to the compactor, such as directly in front of it, if desired. The ram 23 cycles between an OFF position, within the compactor 22 and a fully extended position (START) in the bin 21 to compress waste in the bin. The ram 23 extends and retracts to its home position upon turning it to START.

Figure 2A:
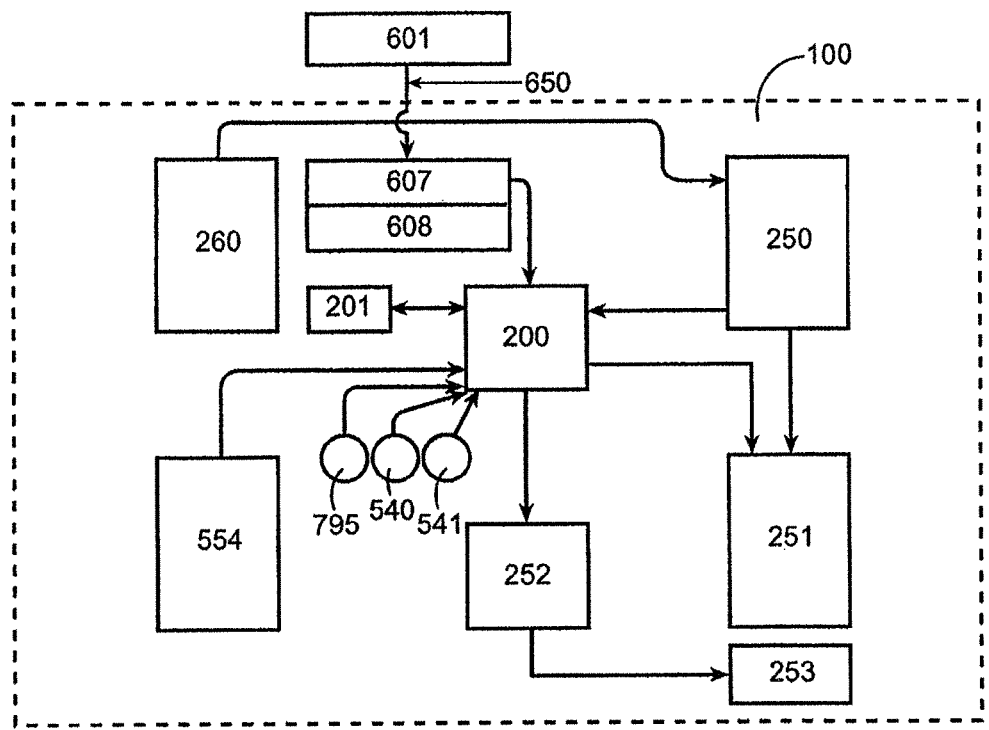
FIG. 2A is a schematic view inside the main or master control panel.
Figure 2B:
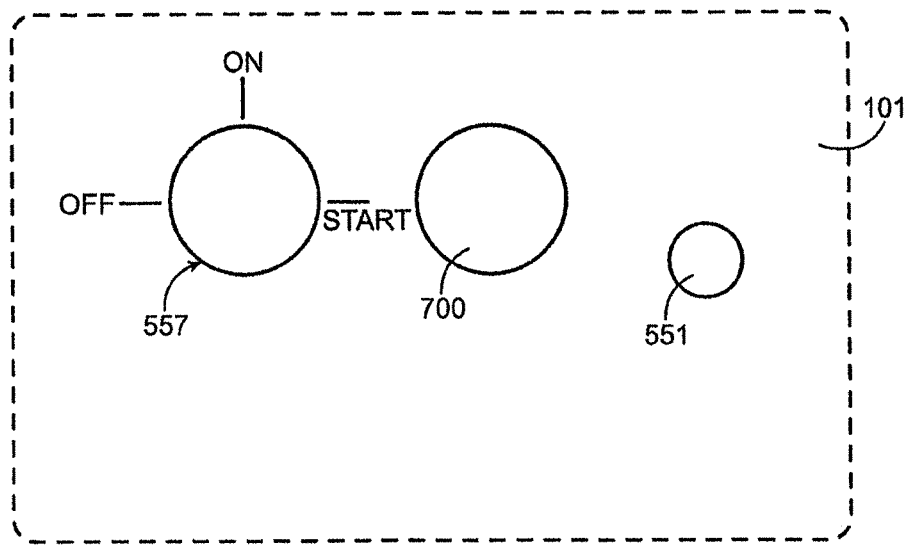
FIG. 2B is a schematic view of the cover of the control panel.

The ram controller is located on and built into the cover of the master control panel 100, shown generally in FIG. 2B and reference number 101. The cover 101 of the control panel 100 includes an emergency stop button 700 and key hole or switch 557. This emergency stop button 700 is directly in communications with the mechanism for controlling the ram 23 for instantly stopping the ram 23 during the compression cycle. The key hole 557 requires a mating key in communications therewith for operating the system. In short, the system can only be operated by putting a key (not shown) in the keyhole 557 and turning the key from the OFF position to the START position. The ram 23 will not operate unless and until a key is inserted into the keyhole and turned.

As noted, the ram controls (key hole 557 and button 700) can be separated and located adjacent to the compactor, such as directly in front of it. Specifically, a separate stand-alone control panel can be built and modularly connected to the system or master control panel 100. In this manner, it can be located to a separate location (e.g., in front of the compactor, to the right side of the compactor, etc.) or in multiple locations. Having a modular connection permits one to set-up and install multiple ram controls. It can be set-up and used in a plug-and-play manner.

As noted, the container 20 further includes a master control panel 100 for monitoring the many monitoring and controlling functions associated with the container 20.

FIG. 1 further schematically shows a video or camera 300 and a truck 400 with a flatbed 401 thereto for carrying the bin 21 to a separate location, such as a recycler or landfill.

II. The Video/Camera 300

The video/camera 300 is positioned to monitor the container 20 twenty-four (24) hours a day, seven (7) days a week, and to record events. While the camera may be analog, it is preferably a digital camera. Events are defined by the users or service provider and include the opening of the chute door 30 to the bin 21, turning ON the compactor 22 to drive/extend the ram 23, removing the bin 21, such as by truck 400, technician signing in, etc. These events are sensed by the many sensors, generally designated 303, associated with the container 20 and connected to the PLC 200 within the control panel 100 (connection line 304) or directly to the camera (connection line 305). The sensor, shown generally by reference number 303, can be one or more sensors. Such sensors include a motion detector, a proximity switch, a door switch (such as on the chute 30 or on the entrance/exit door to the compactor), a weight sensor (such as when trucks drive near the bin), etc. In addition, the sensor 303 can include image recognition so as to differentiate between semi-trucks delivering products to a dock or a garbage truck or hauler picking-up the bin. In these instances, the semi-truck will not be recognized as an event and a hauler's truck will be recognized as an event. One such sensor is an ultrasonic sensor, which works similar to radar or sonar and evaluates attributes of a target by interpreting the echoes from radio or sound waves respectively. These devices can be used to sense an image's metal, such as that of a truck.

The software 301 associated with the camera 300 is set by a user or service provider to segregate and store recorded information around an event, such as three minutes, two minutes, one minute forty-five seconds, etc. For example, when an event has been sensed, such as the opening of the chute door 30 (with a switch sensor), the images recorded one minute before the event and one minute after the event are separated-out by the software 301 and stored in a camera memory 302. The memory 302 stores only the events, that being the pre-set time before the event and pre-set time after the event, for review later on premise or remotely. In the preferred embodiment, during this separation and storage of the images taken around the event, the camera 300 continues to record. As a result, while the camera is continuing to record, the software and memory can separate and save the event related recorded materials for reviewing separately.

Once an event has been detected or recognized, the PLC can send a notification or alarm. A notification or alarm is anything capable of alerting the central station, remote location, or individual that an event has occurred. This may be maintenance personnel, security personnel, the service provider or others. In short, it is a recognizable event to the PLC which can communicate locally or remotely (See FIG. 7). For example, the alarm/notification can take the form of an audible alarm, an audio message, an email message, a picture segment (such as to a cell phone, an MMS message, a SMS message, etc.) and other methods well known now or developed in the future.

The above system can be valuable in not only preventing theft and vandalism, but also to verify pick-up by the hauler, work by a particular technician, and monitoring damage. For example, if a truck damages the container and is recorded as an event (such as when there is a motion sensor around or on the container), instant evidence will be available to determine when the damage occurred and who did the damage.

III. The Master Control Panel 100

FIG. 2 shows a general schematic view inside the control panel 100. Generally, the panel 100 incorporates interactive audio with messaging. It can be used to generate activity and event reports for alarming, service, container, fill, and door (chute and back) functions. Standard RFID tags, or other type product or package tags, can further be tracked to give the user and service provider access to a database consisting of the tags passing through the equipment. The database is held locally in the control panel.

Significantly, the control panel can be customized depending on the container's, customer's, hauler's, and service provider's needs. The description herein is only general and foundational.

| The PLC 200 within the Control Panel 100 and Sensors | | |
| --- | --- | --- |
| INPUT INTO THE PLC (Sensor/Clock) | THRESHOLD ALARM CONDITION(S) | OUTPUT |
| Emergency Stop Button 700 | The Emergency Stop Button Pushed In To Stop Ram The Emergency Stop Button Pulled Out To Retract Ram | Alarm When Button Pushed In |
| Chute Door Switch Sensor 550 | Chute Door Open | Alarm When Door Is Open |
| Multi-Cycle Button 551 | None: Input Only | The Ram Will Cycle More Than Once |
| Sensor As To The Amount Of Waste (Hydraulic Sensor 556 As To Pressure Applied By Ram) | Detection Of PSI At Or Above A Threshold (E.G., 1800 Psi) Translating To Bin Full | Alarm When Bin Is Full Ram Will Not Operate |
| Oil Level Sensor 552 | Detection Of Oil Being Low | Alarm When Oil Is Low Ram Will Not Operate |
| Photocell Sensor Between Compactor And Bin 553 | Detection When Bin Is Detached Or Misaligned From Compactor | Alarm When Bin Is Detached/Misaligned |
| System Overload Sensor 554 | Detection When System Is Overloaded (Problem, Power Spike, Power Outage) | Alarm When System Is Overloaded Ram Will Not Operate |

| The PLC 200 within the Control Panel 100 and Sensors | | |
|---|---|---|
| INPUT INTO THE PLC (Sensor/Clock) | THRESHOLD ALARM CONDITION(S) | OUTPUT |
| System Test (Toggle Switch 795) | None: Input Only | The System Will Run A Test (3 Cycles) |
| Preventative Maintenance (Maintenance Clock/Counter Or Override Toggle Switch 555 Associated With Compactor) | Preselected Intervals/Cycles | Alarm At Preselected Intervals For When Service Is Needed |
| Key ON/OFF/START 557 | Note: Input Only | The System Can Be Turned On, Off And Started. |
| Technician Switch(es) In Control Panel 540, 541 | Detection And Clock Re Technician Check-In And Check-Out | Alarm When Technician Checks-In And Checks-Out |
| Sensor To Back Door Or Entrance/Exit Door | Detection Of When Back Door Or Entrance/Exit Door Is Opened | Alarm To Prevent Theft |
| Fire Detector | Detection Of Fire/Smoke | Alarm To Fire Conditions |
| Hazmat Detector | Identification Tag Associated With Non-Complaint Materials In Bin Data Collection And Recording | If Non-Compliant Material Is Detected, The Ram Will Not Operate |
| Sensor And Clock For Compactor Running | Times And Time Compactor Is Off And Time Compactor Is On | Record Data |
| Sensor And Clock For Chute Door | Times And Time Chute Door Is Open And Closed | Record Data |
| Sensors To Compactor's Pressure To Waste | Monitoring Compactor's Pressure | Record Data |
| Sensor To Operations (Odometer On Ram) | An Odometer To System's Operations | Record Data |

The configuration of the PLC is shown in the flow chart of FIGS. 8-12. This represents a single flow chart broken into segments. Line 1220 extends between starting the compactor 701, through the various checks A-A, B-B, C-C, D-D, to beginning the ram's cycle 702. The Figures show the input and output of the PLC. The horizontal line 1200 represents the events, checks or actions performed or checked between turning the compactor key switch 557 to START (block 701) and starting the ram's cycle (by extending the ram) (block 702). All of the system checks (710, 720,730,740,750,760,770,780,790,810,820,830,840) must be "ON" or "OFF" (where required) for the ram's cycle to begin a cycle.

The flow-chart of the system is summarized below. Each system check or input discussed below is hardwired to the PLC so that it may run a thorough check of the system and accept the input before operating the ram.

IV. General Technician Log-In and Log-Out (901-914)

At certain instances, either by prompting, notification or other method, a technician will need to access the interior of the master control panel 100 and work on the various components of the system. Once a technician signs into the system, the ram will not operate. In addition, while certain alarm conditions are occurring the ram will not operate. For example, if the chute door 30 is open (Chute door Check 730), a message will present 731 and the ram will not cycle until the chute door situation has been resolved.

The master control panel 100 has a lock (not shown) to prevent unauthorized access therein. This lock can be a key, combination, touchpad, biometric, etc. The service technician signs into the system to log-in 901. This can be accomplished when the technician accesses the panel, such as when using a touchpad or biometric, or once access is gained inside the control panel. Any well-known method can be used to sign-in to the panel, such as flipping a switch, turning a key, entering a code into a touchpad, etc. 540. Immediately thereafter, a message will be generated on the control panel's audio system (speaker 253) stating "The Service Tech has Checked In" and the system will formally check and record the technician in by date, time, tech identification (number) into the system 902. This can be held in an associated database and memory 201 and/or transmitted by the communications system (sound system and speakers 252,253 and/or communications center 251) in the control panel.

Next, the technician will attempt to perform and complete the necessary repairs 903 on the system. Thereafter, a decision 904 needs to be made; the technician will have either completed the repairs or not (usually due to the need for additional parts). If the technician has completed the repairs 904 a,905, the technician logs out of the system 906 by flipping the switch, turning a key, entering a code into a touchpad, etc. 541 (same or reverse procedure as in step 901). A message will then be generated on the control panel's audio system (speaker 253) stating "The Service Tech has Checked Out" and the system will formally check and record the technician out by date, time, tech identification (number) of the system 907.

At the time of decision 904, if the technician has not completed the repairs 904 b, the technician will log-out of the system 906, which causes the system to generate the log-out message and stamp and record the log-out 907. Once the technician returns with parts 909, the technician once again logs into the system 901, generates a message and stamps the log-in 902, performs and completes the necessary repairs 905, logs out of system 906, and generates the log-out message and records the log-out 907.

To the extent a technician needs to return to the container 10, s/he will log-in and log-out following the procedures set-forth above.

The system will next be allowed to continue with its checks (shown on horizontal line 1200).

V. Messages

It should be noted that when the system generates a message, the message is an audio message broadcasted out of the speaker 253 of the control panel 100. The message can also be broadcasted by email, cell phone, phone, ethernet, etc. via the communications hardware 251 in the control panel 100. See FIG. 7. An important advance is the system 10 can broadcast 251 to a remote location, such as a central station, not only the message but also identifying information about the container. This occurs immediately after an issue has arisen, such as when the chute door is open, or when the oil is low. As a result, any technician about to travel to the container, can, through the central station (ethernet or internet), obtain information about the issue that has arisen. Consequently, the technician can gain a very good idea as to what the issue is (broadcasted in the message) before traveling to the container. This permits the technician to obtain the anticipated repair parts before going to the container. In short, some of the initial diagnosing time may be reduced and typical return trips totally avoided. For example, if the message broadcast relates to the emergency stop button, the technician traveling to the container for repairing same, may bring the necessary parts with him or her associated with issues or problems relating to the emergency stop button.

VI. Emergency Stop Button 700

Before operating, the system first performs a check of the Stop Button system 710. As previously noted the Emergency Stop Button 700 is preferably located on the cover of the master control panel 100. See FIG. 2A. It is intentionally conspicuously noticeable and may be illuminated all the time for identification purposes. When the button 700 is pushed in, the unit will not operate 710 a. When the button 700 is pulled out, the ram 23 will retract to the retracted, home position in the compactor (and totally out of the bin). When the button 700 is in the middle position, the system will operate as normal.

Accordingly, if the button 700 is pushed in, the system will generate the following message 711 "Unit will not Operate with Stop Button Pushed In" through the speaker system 253 and possibly a message board associated with the container. If all appears okay, the stop button 700 can be pulled out 712 to the middle position and the system allowed to proceed to its further checks 713 a,714, 1200. If there is still an issue or problem 713 b, pulling the stop button out will not work, the button 700 should be pushed in again 710, generating the Stop Button message 711 and preventing the ram from operating 710 a. At this point, a MMS ticket (the communications hardware 251 generating a work request form or some alert that the system has an issue/problem) is also created or generated and a technician called 715. A technician is called in and the steps identified above in the section titled "General Technician Log-In and Log-Out" are followed to check in, work on and check out of the system. While the flowchart identifies an MMS ticket being generated, it is recognized the alarm/notification can take many forms, such as by example, an audible alarm, an audio message, an email message, such as to a cell phone, an MMS message, a SMS message, etc., and other methods well known now or developed in the future. The message is at least sent to the central station 267.

The system next performs a check of the ram retraction system 720. As noted previously and shown on the horizontal flow-chart line 1200, when the stop button 700 is pulled out, the ram 23 will retract to the home, retracted position 721. If the button 700 is brought to the center 722, the system will progress 723 to the next check 1200,730.

VII. The Chute Door 550 (730-735)

The system next performs a check of the chute door system 730. The chute door 30 has a standard, well-known switch sensor 550 associated with it, such as a door switch. The switch is closed when the door is closed and opened when the door is opened, or vice versa. When the door's switch sensor senses the door 30 being open 730, the unit will not operate 730 a and the system will generate the following message 731 "Unit will not Operate with Chute Door Open." If everything is okay, the chute door 30 can be closed 732. Because the message is audio and, if desired, transmitted also to the manager of the facility, the manager can go to the container and correct or rectify any issues. This may include merely closing the door because it was inadvertently left open or jammed. At this point of decision 733, if everything is resolved and continues to be okay, the system is allowed to proceed to its checks 733 a,734, 1200. If there is still an issue or problem at the point of decision 733 b, the system will continue to show the door 30 remains open 730, generating another Chute Door message 731 again and preventing the ram from operating. A MMS ticket is also created or generated and a technician called 735 as discussed above. A technician is called in and the steps identified above in the section titled "General Technician Log-In and Log-Out" are followed.

As noted previously and shown on the horizontal flow-chart line 1200, when the stop button 700 is pulled out 720, the ram 23 will retract to the home, retracted position 721. If the button 700 is brought to the center 722, the system will progress 723 to the next check 1200.

VIII. The Multi-Cycle Function 551 (740-742)

The system next performs a check of the multi-cycle system and function 740. This is only an input to the system, namely a fault is not detected. The only item detected is whether the Multi-Cycle button 551 is pushed in. The multi-cycle button 551 is shown on the cover 101 of the panel 100 in FIG. 2A. It can, of course, be located within the panel and at other locations as a simple switch or button.

When the button 551 is pushed in 740, the unit will generate two cycles 741 to the ram 23. Specifically, the ram 23 will extend, retract and then extend again and retract again when the system is next operated. When the button 551 is not pushed in, the system will continue with its checks 742, 1200.

IX. Oil Level Sensor 552 (760-765)

The system next performs a check of the oil level 750. The compactor 22 has a standard, well-known oil level sensor 552 associated with it. When the oil level is sensed to be low 750 a, the unit will generate the following message 751 "Oil Level is Low, Need Service." A MMS ticket is also created or generated and a technician called 752 as discussed previously. A technician is called in and the steps identified above in the section titled "General Technician Log-In and Log-Out" are followed.

Specifically, the technician will add oil to the compactor and ram or make necessary repairs (such as when there is a leak). Once the technician has logged-out, the system continues on with its checks 753, 1200.

X. Detachment Between Compactor and Bin by Photosensor 553 (760-765)

The system next performs a check of the alignment and attachment of the compactor and bin openings 760. A standard photocell sensor or proximity sensor 553 is disposed between the opening 24 of the compactor 22 and the opening 25 of the bin 21 to determine if the two are correctly aligned and attached, if necessary. When the doors are sensed to not be aligned and adjacent/attached 760 *a*, the unit will generate the following message 761 "Container is Detached, Unit will not Operate." A MMS ticket is also created or generated and a technician called 762 as discussed previously. The operator or manager can then try to realign and attach the doors and reset the sensor 763. At this point of decision 764, if the operator is successful, the system will progress to continuing its check 764 *a*,765, 1200. If the operator is unsuccessful, the system will generate another message 761 and create another MMS ticket or the prior message will stay on and ticket remain outstanding 761,762. A technician is called in and will then take the steps identified above in the section titled "General Technician Log-In and Log-Out."

XI. Hazardous Material 501 (HAZMAT)(770-777)

The system next performs a check for hazardous and/or non-compliant material 770. A comprehensive discussion regarding the tracking of waste using RFID tags 501 or similar is discussed in more detail in a section below. Generally, hazardous materials and non-compliant materials can be tagged with specific RFID tags/labels identifying them or their packaging as such. For the purpose of this disclosure, all special material or non-compliant material will be called HAZMAT or hazardous material even though it may not be hazardous. The system has an RFID antenna 601 (or similar) connected to a reader 607 and small computer 608. The computer 608 has a program therein for identifying HAZMAT or non-compliant similar identifications and feeding such information to the reader 607 for alerting the PLC 200. Very generally, the computer 608 compares the identification numbers sent to it by the reader and compares those identification numbers with those stored in its database of non-compliant identification numbers. If a match is made concerning a non-compliant identification number, the computer alerts the reader 607 which communicates the alert to the PLC 200.

Of significance is if hazardous material is detected by the system among the waste in the container, the system will shut-down or not operate and will further generate a message or notification. Accordingly, if hazardous material is detected 1051, the unit will generate the following message 771 "Non-Complaint Material." The material thus needs to be removed 772 by the operator or another person. At this decision point 773, if the material is successfully removed, the system will progress 773 *a* by having a manager reset the detection system 775, generating a message 776 "Material Has Been Removed," and continuing on to the system check 777,1200. It should be noted, the system reset 775 can be done remotely via a web interface or code or at the PLC in the control panel (or a button on the front panel of the control panel).

If at the point of decision 773, the material cannot be removed 773 *b*, a MMS ticket will be created and generated and a technician called 774. A technician will be called in (as discussed above) via the communications hardware 251 and will then take the steps identified above in the section titled "General Technician Log-In and Log-Out" to try to successfully remove the material. If the material is successfully and completely removed 903 *b*, 903 *c*, the technician can log-out 906,907 and the system is reset 775, generating a message 776 and the system continues with its checks 777, 1200 *n*.

XII. System Overload Sensor 554 (780-783)

The system next performs a check to ensure the compactor is not overloaded 780. A sensor 554 associated with the compactor 22 and motor for driving the ram 23 detects when the motor (not shown) is overloaded. Such situations occur when, for example, there is a motor problem and power spike. The sensor used would be any standard, well-known sensor available on the market for performing such tasks. When the system detects an overload 780 *b*, the unit will generate the following message 781 "Compactor Needs Service." A MMS ticket is also created or generated and a technician called 782 as discussed previously. The operator can then try to repair the situation and take the steps identified above in the section titled "General Technician Log-In and Log-Out." Once the technician has logged out, or there was not an overloading issue, the system will continue with its checks 783.

XIII. System Test 795 (790-794)

The system next performs a check of the factory test of the system 790. Specifically, a switch 795 within the control panel 100 permits a technician to run a test. This is an input only. When the technician turns-on or flips a toggle switch 795,791, the system cycles continuously 792 (e.g., the ram 23 extends and retracts) permitting the technician to watch and study the system 10. When observation 792 is complete, the technician can toggle off the switch 795,793 and the system will progress to performing its further tests 794, 1200. Under normal conditions, a factory test is not being performed and this is OFF, permitting the checks to continue 1200. At the time of installation or at times after repairs have been made, the technician will run factory tests 790-795.

XIV. Preventative Maintenance (PM) 555 (810-813)

The system next performs a check for preventative maintenance 810. An internal clock or counter 555 associated with the system 10 is connected to the compactor 22. This counter or clock 555 counts either days or ram cycles to generate or trigger maintenance messages and maintenance at pre-selected intervals, such as every three months or after 250 cycles, etc. The clock/counter also includes an override switch permitting an override by the technician (canceling the maintenance).

At the pre-selected interval, the machine goes into a preventative maintenance mode 812 by generating a message 811 stating "PM is Being Performed. Only Technician Should Operate Compactor." A technician working on the system 10 will then take the steps identified above in the section titled "General Technician Log-In and Log-Out" to check in, work on, and check out of the system. Typically, there are set procedures for the technician to perform as preventative maintenance. For example, once the technician has checked into the system 901,902, s/he will activate the preventative maintenance cycle 813. Once completed, the technician must reset or restart the clock or timer which will generate the message 814 "Preventative Maintenance Compete." If desired, the technician can also override the preventative maintenance system by, for example, merely resetting the timer, clock or counter. The technician checks out 906,907 and the system then proceeds with its further checks, 815, 1200.

XV. Technician Checked In (820)

The system next performs a check to determine if a technician is checked into the system 820. A technician working on the system takes the steps identified above in the section titled "General Technician Log-in and Log-out." Once the check 820 is completed, the system continues on with its checks 910, 1200.

XVI. Compactor Full 556 (830-837)

The system next performs a check of the compactor and ram 830. The compactor's ram 23 has a pressure sensor associated with the hydraulics driving it. In particular, as the bin 21 fills-up with waste, the ram 23 exerts more pressure on it. Specifically, a standard pressure transducer associated with the ram is capable of detecting pressure against the trash as a voltage input to the PLC. As pressure increases, waste increases. Thus, when the hydraulics require the ram to exert a threshold amount of pressure, the bin is at or near capacity. In the example of the Figures, that threshold amount is 1800 psi. When the compactor sensor detects the system is at or beyond the threshold pressure 830 *a*, the unit will not operate and the system will generate the following message 831 "Your Compactor is Full." The operator depresses the Emergency Stop 700,832 and may make a visual inspection of the system 10. At the next point of decision 833, a determination is made. If the issue is resolved, the operator, pulls the emergency stop button to the middle position and the system continues to its checks 833 *a*, 837, 1200. If there is still an issue or problem at the point of decision 833 *b*, the system will continue to show the compactor is full, generating another Compactor Full message 831 and preventing the ram from operating. A MMS ticket is also created or generated and a technician called 834 in the manner discussed previously. A hauler is brought in to empty the bin 835. If the issue is resolved 836 *a*, the system is allowed to proceed to its checks 837, 1200. If it is not resolved 836 *b*, a message 831 will again be generated and a MMS ticket will be created and generated and a technician called 834. A technician called in will then take the steps identified above in the section titled "General Technician Log-In and Log-Out" and try to successfully repair the system.

XVII. Key ON/OFF 557 (840-842)

Finally, the system next performs a check to ensure the key is turned on 740. A system key is associated with the control panel 100 and specifically its cover 101. The key system 740 has three positions, namely OFF, ON and START. When the key is in the start position 841, and all the checks are completed and in their proper ON or OFF configuration the ram cycle can start 702. In short, the last check 840 determines if the key has turned the system to START. If the key is not turning the system ON, the system will not operate.

XVIII. Additional Items

The back door to the system 10, such as a separate area for handling waste, or an entrance/exit door (not shown) to the system can further be monitored in the same manner as the chute door discussed above. The sensor can be connected to the PLC as with the chute door. As a result, the opening and the duration of the opening can be detected. In addition, the system can be prevented from operating while the door is open. Monitoring the back door can assist in preventing thefts from the bin.

A spare input into the PLC can be used to attach a fire monitor/detector. In addition to generating an alarm, a notification can be made to authorities via a 911 call if a fire is detected.

XIX. Communications

The master control panel 100 holding the PLC 200 further includes a power source 250 for energizing the components in the control panel. The PLC is connected to a sound board 252, which in turn, is connected to one or more speakers 253 so that an audio alarm may be sounded in one or more locations. Lights (not shown) may also be hooked-up to the system to show visual alarms.

The control panel includes one or more transformers 260 connected to the power source and possibly various components to adjust or step the voltage and currents.

Figure 7:
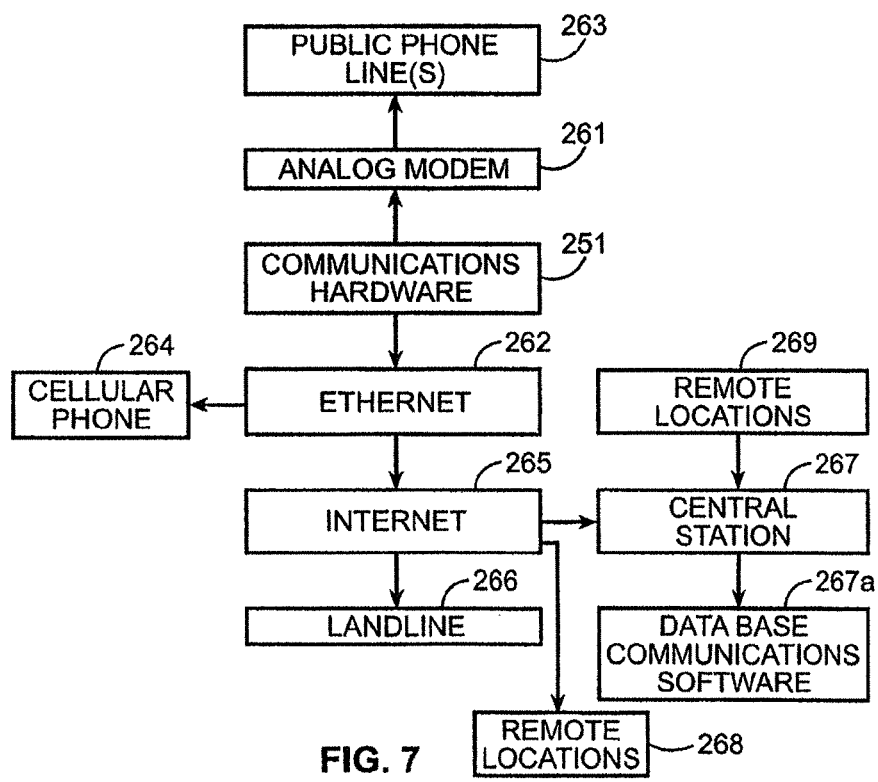
FIG. 7 is a block diagram of the communications systems.
Figure 8:
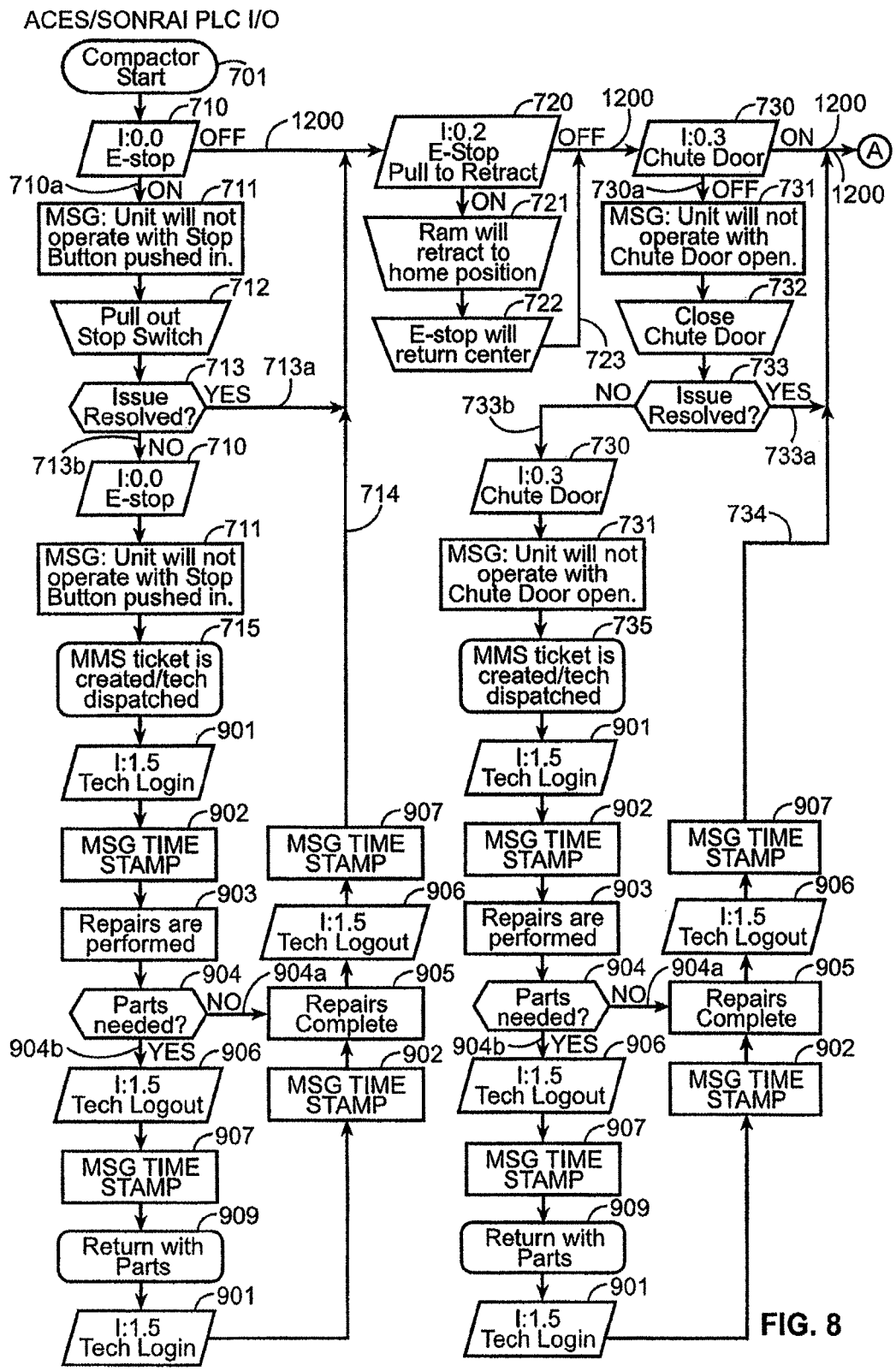
Figure 9:
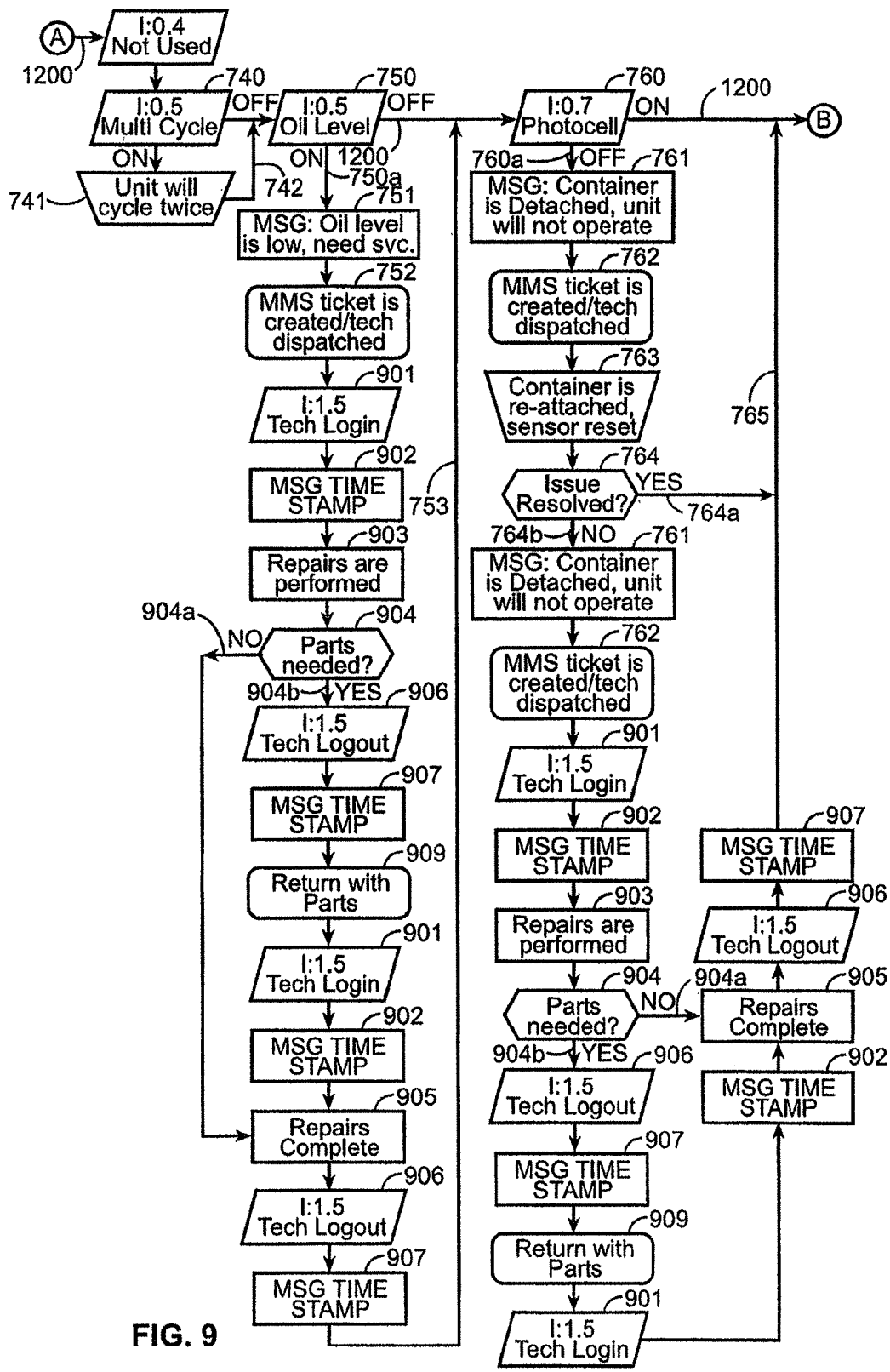
Figure 10:
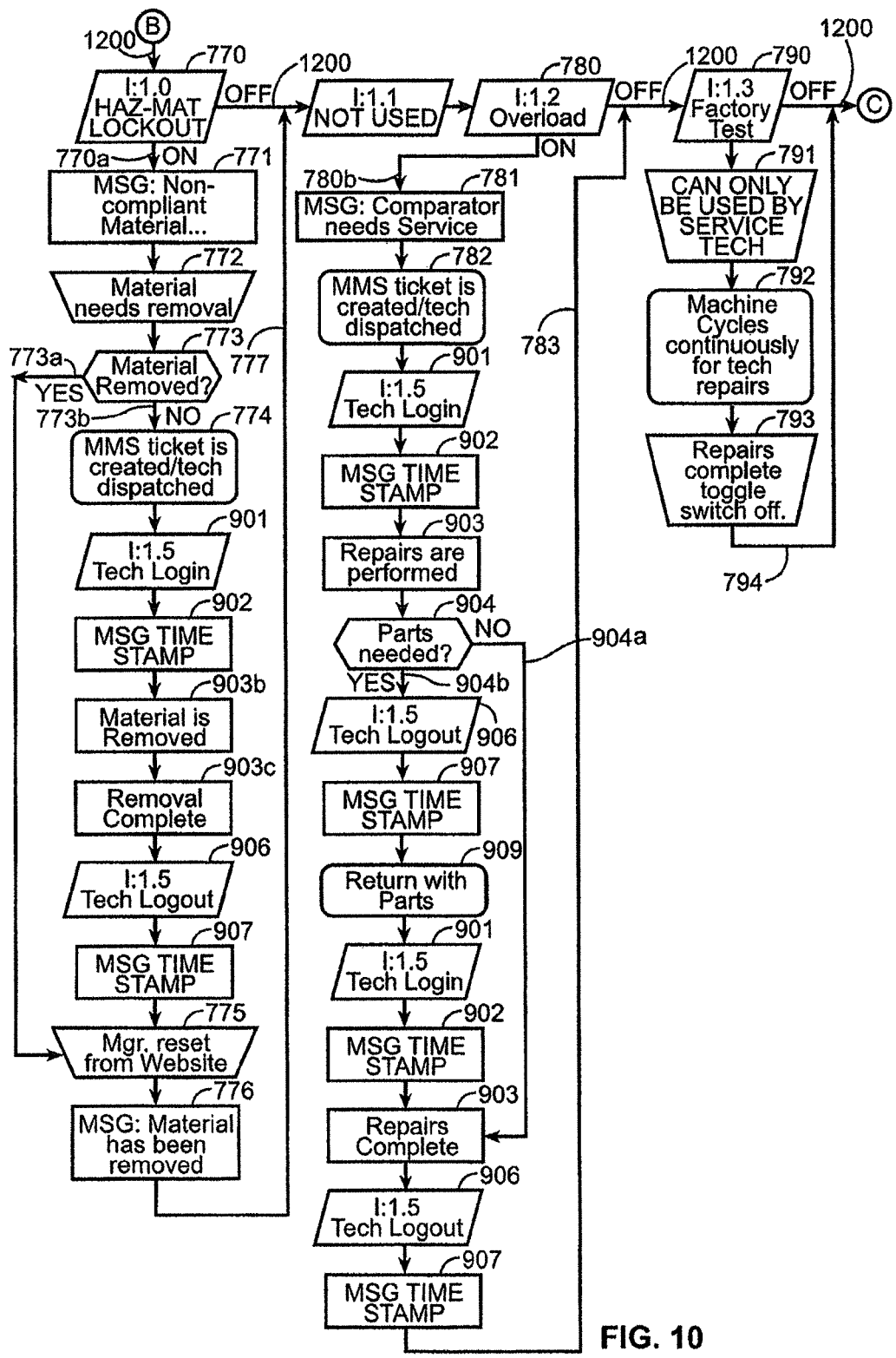

The PLC 200 is also connected to a communications hardware, generically shown at 251. Generally, the system incorporates a concentrator and can use a modem LAN, or wireless system, and/or other well-known communication systems, devices, and mediums, to communicate to different locations. For example, as shown in FIG. 7, the communication hardware can include hardware, software and/or connections to permit information to be transmitted and communicated or polled from the outside via telephone wires, wireless communication, the internet, an ethernet, or any other ways well known in the art. Each of these devices are well-known to those in the art. The communications hardware 251 in the master control panel 100 can be connected to an analog modem 261 for transmitting and receiving inquiries via public phone lines 263. In addition, the communications hardware 251 can be connected to an ethernet hub 262 for communicating with a cellular phone or cellular phone system 264 or to the internet 265. Once connected to the internet 265, the system can be connected to a landline 266, to a central station 267 (that can be accessed by remote locations 269) or to other remote locations directly 268. It is recognized that the central location can include a database with memory, communications devices and hardware and software interface 267 *a* for storing the data in memory received from or transmitted from the equipment and house the software necessary to generate reports, communicate with remote users, owners, managers, supervisors, and operators of the equipment and service people, and to generate alarms and service calls etc. necessary to run and maintain the equipment. While this is generically described above as "a MMS ticket is also created or generated," who gets contacted (and how that person is contacted) can be customized and easily configured.

Accordingly, someone from a central station 267 can, for example, via the internet or wireless, connect to the PLC and poll it for conditions and other information. Similarly, when an alarm condition is detected, the PLC can not only generate an audio and visual alarm, but also communicate with another (central station or remote location) location as to the alarm condition alerting the other location of the alarm condition. The communications system 251 can also be equipped for two-way communications with a call button (not shown). For example, it can be set-up to receive and transmit audio or other types of messages. As a result, a technician, service manager or operator can talk with the central station regarding issues, warnings, checks, and the like. The call button can be used to notify an outsider, such as the central station.

The present waste tracker system can record the numerous inputs to the controller in a database or memory 201 and can permit one to remotely monitor the equipment (e.g., sensors above), monitor the services (e.g., pick-ups, frequency of pick-ups and confirming pick-ups), monitor the repair services (and verifying same) and monitor the supply chain (e.g., warehouse management) of the waste, pick-up and dispensing thereof.

Accordingly, in summary, the system is fully capable of sending alerts, Multimedia Messaging Service (MMS) messages (a standard for telephone messaging systems allowing sending messages including multimedia objects (images, audio, video, rich text)) and Short Message Service (SMS) messages for fullness and problems situations (Alarms), and email. Any form of communications known or hereto known can be employed. In addition, beeps and fax alerts can be generated along with work orders, service tickets, instructions, status, and reports. Such reports can include equipment usage, equipment effectiveness, remote monitoring usage, service history, repair history and others well known in the industry. By way of example, activity and event reports can be generated for alarming conditions, types and frequency, service calls and performance, container status and fill, chute door, and back door.

XX. General Summary

Individual remote stations push information via telephone or ethernet to a single PLC concentrator. This concentrator is used by the management system to put information into a SQL database. Pushed information provides daily data collection, alarming, and billable option notifications.

In summary, the system can generate the following Alarms:

| Alarms |
|---|
| Compactor Full. |
| Low Oil Level. |
| Container Detached. |
| Technician Check Out & Time (Min.). |
| Motor Overload. |
| System Needs Service. |

The following data can also be collected:

| Daily Data |
|---|
| Container OFF Time (Sec). |
| Chute Door Open Time. |
| Last Compaction Pressures. |
| Equipment Total Operations (Odometer). |

The following options are also available and accessible:

| Options |
|---|
| Days since last Preventative Maintenance. |
| Theft prevention (Back or Entrance/Exit Door Monitor). |
| Fire System Input Monitor. |
| Security System Input Monitor. |
| RFID tags through information. |

And, the system can produce the following status reports:

| Status (At Time of Record) |
|---|
| Inputs & Outputs. |
| Mode (Conditions of Operation). |
| Ram Position (Inches (est.)). |
| Hydraulic Oil PSI. |

It is recognized that with the communications hardware, remote access, with proper safeguards, can permit a remote user to not only access information (such as status reports and system diagnostics) but also control the system of the present invention. An override (not shown) can be inserted into the system so as to permit a remote user or a technician (or an qualified individual) to perform certain tasks at certain times, such as without limitations, extend the ram to compact the waste, perform multi-cycles, retract the ram, stop the system, etc.

XXI. Tracking Waste

Figure 3:
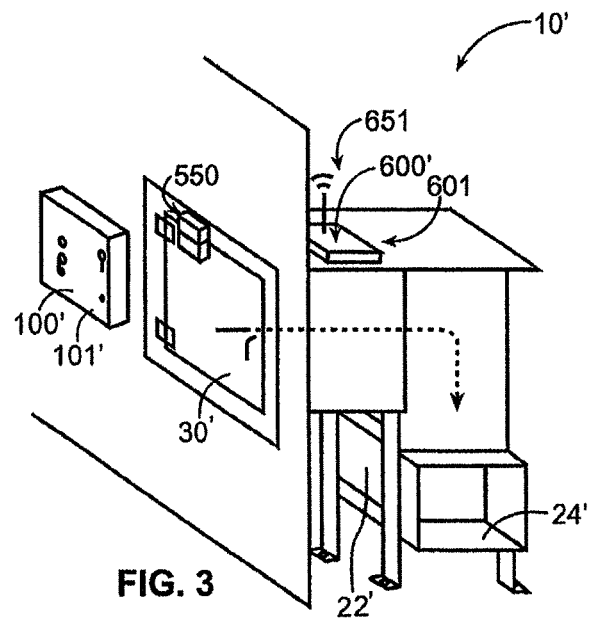
FIG. 3 is an embodiment of a bin or container without the compactor attached thereto.
Figure 4:
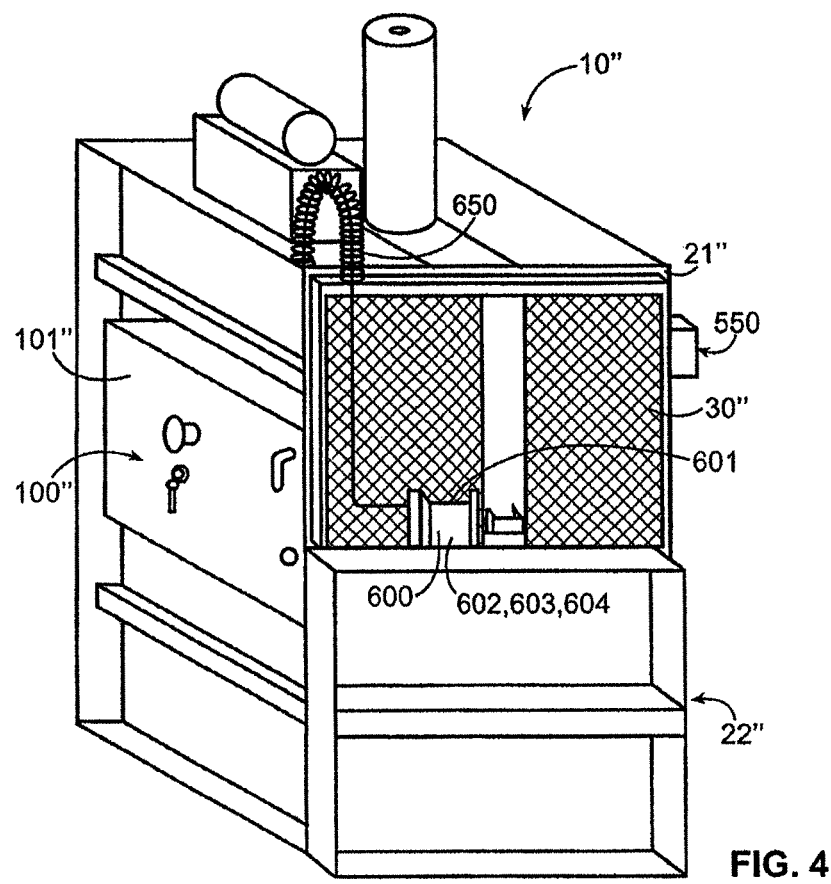
FIG. 4 is an embodiment of a baler.
Figure 5:
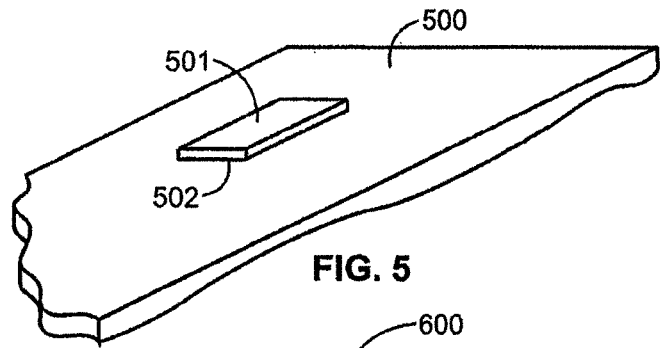
FIG. 5 is an article of waste with an RFID tag or the like attached to it.

FIGS. 3 and 4 show typical balers or containers for holding waste. Items and components identified in FIG. 1 are likewise identified (with prime and double-primes) in these figures. According to another aspect of the present invention, articles of waste can be tracked through the container. Specifically, as shown in FIG. 5, an article of waste 500 such as plastic casing for a product has a passive RFID tag 501 securely attached to it by adhesive. RFID tags are radio frequency identification tags well-known in the retail industry for identifying products. In particular, a Radio-frequency identification (RFID) tag or transponder is an object applied to or incorporated into a product for the purpose of identification using radio waves. Most RFID tags contain at least two parts, namely an integrated circuit for storing and processing information, modulating and demodulating a (RF) signal and an antenna for receiving and transmitting the signal. RFID tags come in three general varieties: passive, active, or semi-passive (also known as battery-assisted). Passive tags require no internal power source, thus being pure passive devices (they are only activated when a reader is nearby to power them), whereas semi-passive and active tags require a power source, usually a small battery. While the present discussion focuses on passive RFID tags, it is recognized that a similar system can be used for active and semi-active RFID tags.

While RFID, and in particular passive RFID tags are discussed herein, it is recognized that other identifying or alerting tags can be used. Many are known and perhaps others in the future. For example, EAS tags can be used. Electronic Article Surveillance tags. It is a technology commonly used to prevent shoplifting from retail stores. The EAS tags are attached to merchandise and are removed or deactivated by the clerks when the item is properly bought or checked out. At the exits of stores, a detection system sounds an alarm or otherwise alerts the staff when it senses active tags. These tags are typically made of a strip of amorphous metal (metglas) having a low magnetic saturation value. This strip is also lined with a strip of ferromagnetic material with a coercive field (magnetic "hardness"). Detection is achieved by sensing harmonics and sum or difference signals generated by the non-linear magnetic response of the material under a mixture of low-frequency (in the 10 Hz to 1000 Hz range) magnetic fields.

When the ferromagnetic material is magnetized, it biases the amorphous metal strip into saturation, where it no longer produces harmonics. The tags are activated by demagnetization and deactivated with magnetization.

The container includes a plurality of walls to contain the waste. In the preferred embodiment, an antenna 601 is positioned within an antenna assembly 600 relative to the container 20 for both activating and reading the identification information on the RFID tags 501 attached to packaging 500 placed within the container. The information from the RFID tags is transmitted through cable(s) 650 within a track (track-cable) or wirelessly 651 to a reader 607 connected to the PLC 200 in the control panel 100. Once the RFID information 501 is fed 650, 651 to the reader 607 and PLC 200, it can be recorded or communicated to an outside source.

As noted previously, the reader 607 can also be connected to a computer 608 for storing data and running programs, such as identification comparison programs for non-compliant materials in the bin, such as hazardous materials.

Figure 6:
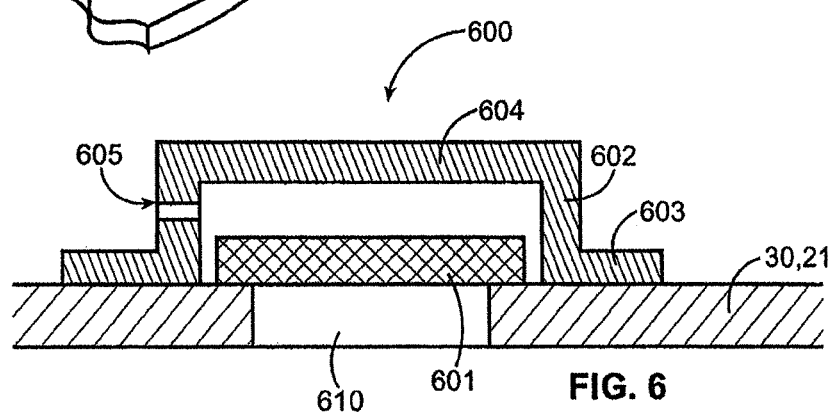
FIG. 6 is a cross-sectional detail of the antenna assembly and antenna secured to a wall or door.

As shown in FIG. 6, the antenna 601 is attached to a wall of the container 21 or door 30 of the baler/container and encased. Specifically, an opening 610 is cut or created in the container or door and the antenna assembly 600 is placed thereover so as to be in direct communication with the inside of the bin. The antenna may be attached to the wall by fasteners or adhesives. The antenna is surrounded by a casing comprising four walls 602, each with outwardly projecting flanges 603, and a top 604. The flanges 603 have holes (not shown) therein for passing fasteners through to secure the casing to the container wall. The casing is preferably made of steel so as to act as a shield to the RFID antenna 601. An opening 605 is provided in one of the casing's walls 602 to permit a power and data cable to run to the antenna assembly 600 and antenna 601.

This construction allows the antenna 601 to wake-up and read or transmit the identification information on each RFID tag 501 in the container 20 without being affected by RFID tags or other interference from outside the container. In short, it has been shown that this construction minimizes false readings by the antenna 601 emanating from sources external to the container. The opening 610 in the container adjacent the RFID antenna 601 enhances the signals and communications between the antenna 601 and items (RFID tags 501) in the container 20.

A sensor 550 in the form of a proximity switch is attached to the chute door 30, 30', 30" and surrounding door frame or sidewall of the container. The sensor is hardwired or wirelessly connected to the antenna 601 to turn the antenna on and off. In particular, when the door 30, 30, 30" is opened, the antenna turns off, or cannot operate. When the door is closed, the antenna is activated or will operate. In short, the antenna 601 will only work when the chute door or other door for depositing material into the container is closed. It has been found that this significantly reduces false readings by the antenna.

Information received by the antenna 601 is transmitted via data line disposed between the antenna and the reader 607/PLC 200 and either recorded (the identification information) or communicated (the identification information) to a remote location.

It should be known that in the waste industry some items are identified as "non-compliant" for placing in standard, waste or recycling containers. Such non-complaint items include radioactive items, medical items and hazardous materials (HAZMAT). Accordingly, as discussed above, with the present system, it is possible to detect non-complaint items in the container and signal an alarm or similar. Specifically, the identifying information received and transmitted to the PLC can be monitored by a separate software program 608. The program 608 can be set-up to identify non-compliant identification numbers or information. The action taken when such an item is detected is operator or service provider determined. For example, the items' identification numbers are read and transmitted to the reader and then to a computer 608 and through the software (hosting a list of non-complaint identification product numbers) interpreted as non-complaint, an alarm condition is recognized and can be made (audibly or visually). The individual loading waste into the container can be warned by this alarm so as to remove the non-compliant item from the container. Further, if desired, the PLC can be set-up so the compactor will not extend so long as a non-complaint item is in the container.

In addition to the above, when the container door 30 (or any other doors to it (not shown)) is open, a sensor attached thereto (e.g., sensor 550) can turn the antenna 601 off when the door is open, and/or on when the door is closed. In the alternative, the antenna can be prevented from turning on or activating while the door is in the open position. This too will minimize false readings of items outside the container.

XXII. Additional Uses

Once an RFID antenna for activating and reading RFID tags has been connected to a compactor and/or baler, additional antenna can be used at other locations, such as a receiving dock, to register pallets, cases, packages, box deliveries between the dock, store room and retail floor to record movement to the shelves so that personnel no longer need to record what has been picked and moved, e.g., from the store room. The RFID antenna at the compactor/baler identifies the waste, such as boxes or packages being crushed, to confirm the goods in the boxes or packages reached the shelves. As a result, the store, corporate departments and suppliers can receive updates on the location of goods within about 30 minutes of each movement from the dock to the shelf. This provides more timely and accurate data so as to improve replenishment by stores. It also improves demand forecasting across the board. Further, theft can be monitored. For example, goods not making it into the stores from the docks or boxes not making it from the shelves to the compactors/balers can be suspected of being stolen. Additional RFID antennas between the store room and store floor may also be employed to further track the packages/boxes/pallets/etc.

Further to the above, RFID antennas can be employed throughout the waste management system so as to track or monitor the waste to the landfills or to the recycling facilities.

In addition, it should be noted that once an RFID tag has been read as passing through a baler/compactor, the unique product identification can be recycled. Once the RFID is no longer used, such as when the packaging is sold or destroyed, the same number can be re-used at a future date.

Thus, the RFID tags read in the compactor/baler, which are inevitably going to be destroyed, can be recycled, re-used, or reassigned on new tags for future products. This can be easily accomplished by communicating the collected identifying information to a system or party capable of inventorying the collected identifying information and reassigning the collected identifying information.

By having a central location and database storing the RFID tag information, a user at the computer or at a remote location can access the database storing a list of the tags that have passed through the equipment, giving a more accurate picture of what really is going on in the back room.

In addition to the above, an important component of national and international emissions trading schemes that have been implemented to mitigate global warming is "carbon credits." They are a technique to attempt to reduce greenhouse effect emissions by capping total annual emissions and letting the market assign a monetary value to any shortfall through trading. In theory, credits can be exchanged between businesses or bought and sold in international markets at the prevailing market price. Such credits can then be used to finance carbon reduction schemes between trading partners and around the world. There are also many companies selling carbon credits to commercial and individual customers interested in lowering their carbon footprint on a voluntary basis.

This is relevant because in containers, and specifically balers, the system above can also be used to generate or tabulate carbon credits associated with each baler haul. In particular, RFID tags or the like can include thereon the weight of the packaging (cardboard, paperboard, paper, etc.). As a result, the tags put in the container can be read by the antenna and software associated with the PLC 200 can add the weights associated with each tag so as to obtain and maintain a running total. At any given time, the weights associated with the tags identified in the container can be added-up. This can be used for approximating the weight of the paper products in the container when it is removed and easily translated to carbon credits associated with recycling the paper products. In short, the tags can be used to keep a record of carbon credits obtained and a record of the weight of the paper products being removed.

With this in mind, one can get a very good approximation of the weight of the waste in the container. This information can be used for on-demand hauling; that is, hauling the bin holding the waste therein only when it is needed (at or above a certain weight). This is a technique for on-demand pickups. It is also a way to ensure hauls have been made. For example, the same tag information should not be read immediately after a haul has been made. One can verify not only the fact that loads have been removed by haulers, but also the approximate weight of the hauls. Armed with this information, one can schedule pick-ups more efficiently and effectively.

While the specific embodiments have been illustrated and described, numerous modifications can be made without significantly departing from the spirit of the invention and the scope of protection is only limited by the scope of the accompanying Claims.

What is claimed is:

1. A method for monitoring a waste container for storing waste, the method comprising:
    receiving data from at least one sensor of a plurality of sensors, wherein the plurality of sensors comprises:
        at least one hazardous or non-compliant material sensor for detecting for hazardous or non-compliant material, wherein the at least one hazardous or non-compliant material sensor detects for a tag associated with hazardous or non-compliant material placed inside the waste container, and
        a system overload sensor for detecting for a power spike or power outage associated with a compactor attached to the waste container;
    based on the data, selecting a triggering event from a group of triggering events, the group of triggering events comprising (i) the at least one hazardous or non-compliant material sensor detecting a presence of hazardous or non-compliant material in the waste container, and (ii) the system overload sensor detecting an overload of the compactor;
    in response to selecting the triggering event, setting a preselected interval according to a type of the triggering event selected from the group of triggering events, wherein the preselected interval comprises a first preselected time before the triggering event and a second preselected time after the triggering event;
    controlling a camera to record images proximate to the waste container for the set preselected interval; and
    storing, in a memory, the camera-recorded images for the set preselected interval,
    wherein the method is performed by a computing device that has access to event information, the event information correlating each triggering event of the group of triggering events with a respective preselected interval, and
    wherein selecting the triggering event and setting the preselected interval are performed based on the event information.

2. The method of claim 1, wherein the predetermined type of truck is a hauler truck.

3. The method of claim 1, wherein the waste container further comprises a master control panel for monitoring and controlling functions associated with the waste container.

4. The method of claim 3, wherein the waste container comprises a waste bin for storing waste, and wherein the compactor comprises a ram configured to compress or compact waste in the waste container.

5. The method of claim 4, wherein the master control panel is configured to receive a technician's sign-in and, in response, disable the ram from operating.

6. The method of claim 3, wherein the at least one hazardous or non-compliant material sensor for detecting for hazardous or non-compliant material is an RFID antenna connected to a reader and the controller, the method further comprising:
    comparing an identification number detected by the reader with identification numbers stored in a database of non-compliant identification numbers; and
    in response to detecting a match between the identification number detected by the reader and one of the identification numbers stored in the database, sending an alert to the reader.

7. The method of claim 6, wherein the antenna is surrounded by a casing comprising four walls, the casing being made of steel so as to act as a shield to the RFID antenna.

8. The method of claim 1, wherein the waste container further comprises a chute door,
    wherein the plurality of sensors further comprises a proximity switch attached to the chute door, and
    wherein the group of triggering events further comprises the proximity switch detecting that the chute door has been opened.

9. The method of claim 1, wherein the plurality of sensors further comprises a sensor including image recognition for differentiating between types of vehicles proximate to the waste container, and
wherein the group of triggering events further comprises the image recognition detecting a presence of a predetermined type of truck proximate to the waste container.

10. The method of claim 9, wherein the image recognition is configured to differentiate between a semi-truck and a hauler truck.

11. The method of claim 10, wherein a presence of a semi-truck is not recognized as the triggering event and the presence of a hauler truck is recognized as the triggering event.

12. The method of claim 1, wherein the waste container further comprises a waste bin for storing waste, the waste bin and the compactor each having a respective opening,
wherein the plurality of sensors further comprises a photocell sensor disposed between the opening of the waste bin and the opening of the compactor, wherein the photocell sensor is configured to determine whether the opening of the waste bin and the opening of the compactor are correctly aligned, and
wherein the group of triggering events further comprises the photocell sensor detecting that the opening of the waste bin and the opening of the compactor are not correctly aligned.

13. The method of claim 1, further comprising:
in response to selecting the triggering event, transmitting, to one or more devices, a notification indicating that the triggering event has occurred.

14. The method of claim 1, wherein the plurality of sensors further comprises a fire monitor configured to detect a fire in or near the waste container,
wherein the group of triggering events further comprises the fire monitor detecting a fire in or near the waste container, and
wherein selecting the triggering event from the group of triggering events comprises selecting the detected fire as the triggering event,
the method further comprising:
in response to selecting the detected fire as the triggering event, transmitting, to one or more devices associated with emergency services, a notification indicating that a fire has been detected.

15. A waste container monitoring system for monitoring a waste container for storing waste comprising:
a camera positioned and operative so as to record images proximate to the waste container;
a memory associated with the camera for recording camera-recorded images for a preselected interval associated with a triggering event, wherein the preselected interval comprises a first preselected time before the triggering event and a second preselected time after the triggering event, and wherein the preselected interval is set according to a type of the triggering event detected;
a plurality of sensors configured for detecting the triggering event, the plurality of sensors comprising:
at least one hazardous or non-compliant material sensor for detecting for hazardous or non-compliant material, wherein the at least one hazardous or non-compliant material sensor for detecting for hazardous or non-compliant material detects for a tag associated with hazardous or non-compliant material placed inside the waste container, and
a system overload sensor for detecting for a power spike or power outage associated with a compactor attached to the waste container;
a controller communicatively coupled to the plurality of sensors, the camera, and the memory, and configured to:
based on data received by the controller from at least one sensor of the plurality of sensors, select the triggering event from a group of triggering events, the group of triggering events comprising (i) the at least one hazardous or non-compliant material sensor detecting a presence of hazardous or non-compliant material in the waste container, and (ii) the system overload sensor detecting an overload of the compactor, and
in response to selecting the triggering event:
setting the preselected interval according to the type of the triggering event selected from the group of triggering events,
controlling the camera to record images proximate to the waste container for the set preselected interval, and
storing, in the memory, the camera-recorded images for the set preselected interval,
wherein the controller has access to event information correlating each triggering event of the group of triggering events with a respective preselected interval, and
wherein selecting the triggering event and setting the preselected interval are performed based on the event information.

16. The waste container monitoring system of claim 15, wherein the waste container further comprises a chute door, and
wherein the plurality of sensors further comprises a proximity switch attached to the chute door, and
wherein the group of triggering events further comprises the proximity switch detecting that the chute door has been opened.

17. The waste container monitoring system of claim 15, wherein the waste container further comprises a waste bin for storing waste, the waste bin and the compactor each having a respective opening,
wherein the plurality of sensors further comprises a photocell sensor disposed between the opening of the waste bin and the opening of the compactor, wherein the photocell sensor is configured to determine whether the opening of the waste bin and the opening of the compactor are correctly aligned, and
wherein the group of triggering events further comprises the photocell sensor detecting that the opening of the waste bin and the opening of the compactor are not correctly aligned.

18. The waste container monitoring system of claim 15, wherein the plurality of sensors further comprises a fire monitor configured to detect a fire in or near the waste container,
wherein the group of triggering events further comprises the fire monitor detecting a fire in or near the waste container, and
wherein the controller is further configured to:
in response to selecting the detected fire as the triggering event, transmitting, to one or more devices associated with emergency services, a notification indicating that a fire has been detected.

19. The waste container monitoring system of claim 15, wherein the plurality of sensors further comprises a sensor including image recognition for differentiating between types of vehicles proximate to the waste container, and
wherein the group of triggering events further comprises the image recognition detecting a presence of a predetermined type of truck proximate to the waste container.

20. A waste container monitoring system for monitoring a waste container for storing waste comprising:
a camera positioned and operative so as to record images proximate to the waste container;
a memory associated with the camera for recording camera-recorded images for a preselected interval associated with a triggering event, wherein the preselected interval comprises a first preselected time before the triggering event and a second preselected time after the triggering event, and wherein the preselected interval is set according to a type of the triggering event detected;
a plurality of sensors configured for detecting the triggering event, the plurality of sensors comprising:
a photocell sensor disposed between an opening of a waste bin of the waste container and an opening of a compactor, wherein the compactor is attached to the waste container, and wherein the photocell sensor is configured to determine whether the opening of the waste bin and the opening of the compactor are correctly aligned, and
at least one hazardous or non-compliant material sensor for detecting for hazardous or non-compliant material, wherein the at least one hazardous or non-compliant material sensor for detecting for hazardous or non-compliant material detects for a tag associated with hazardous or non-compliant material placed inside the waste container,
a controller communicatively coupled to the plurality of sensors, the camera, and the memory, and configured to:
based on data received by the controller from at least one sensor of the plurality of sensors, select the triggering event from a group of triggering events, the group of triggering events comprising (i) the at least one hazardous or non-compliant material sensor detecting a presence of hazardous or non-compliant material in the waste container, and (ii) the photocell sensor detecting that the opening of the waste bin and the opening of the compactor are not correctly aligned; and
in response to selecting the triggering event:
setting the preselected interval according to the type of the triggering event selected from the group of triggering events,
controlling the camera to record images proximate to the waste container for the set preselected interval, and
storing, in the memory, the camera-recorded images for the set preselected interval.

\* \* \* \* \*